(12) United States Patent  (10) Patent No.: US 6,870,292 B2
Owada et al.  (45) Date of Patent: Mar. 22, 2005

(54) STATOR FOR MOTOR

(75) Inventors: Yu Owada, Kanagawa (JP); Mitsuo Uchiyama, Kanagawa (JP); Naoshi Sakata, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 78 days.

(21) Appl. No.: 10/288,375

(22) Filed: Nov. 6, 2002

(65) Prior Publication Data

US 2003/0098630 A1 May 29, 2003

(30) Foreign Application Priority Data

Nov. 28, 2001 (JP) ......................................... 2001-361915
Jun. 5, 2002 (JP) ......................................... 2002-163687

(51) Int. Cl.[7] .......................... H02K 1/00; H02K 19/26; H02K 21/00; H02K 23/40; H02K 3/00
(52) U.S. Cl. ......................... 310/194; 310/254; 310/216
(58) Field of Search .............................. 310/259, 258, 310/260, 254, 257, 179, 208, 201, 202, 184; 29/589

(56) References Cited

U.S. PATENT DOCUMENTS

| 4,617,725 | A | * | 10/1986 | Holter et al. .................. 29/598 |
| 5,508,578 | A | * | 4/1996 | Suzuki et al. ............... 310/254 |
| 5,623,174 | A | * | 4/1997 | Markovitz et al. ............ 310/45 |
| 5,763,978 | A | * | 6/1998 | Uchida et al. .............. 310/215 |
| 5,886,444 | A | * | 3/1999 | Enomoto et al. ........... 310/208 |
| 5,986,377 | A | * | 11/1999 | Yamada et al. ............. 310/216 |
| 6,008,563 | A | * | 12/1999 | Baba et al. .................. 310/254 |
| 6,011,339 | A | * | 1/2000 | Kawakami .................. 310/208 |
| 6,072,259 | A | * | 6/2000 | Kawabata et al. .......... 310/216 |
| 6,211,587 | B1 | * | 4/2001 | Enomoto et al. ............. 310/52 |
| 6,218,758 | B1 | * | 4/2001 | Miura et al. ................. 310/254 |
| 6,288,341 | B1 | * | 9/2001 | Tsunoda et al. ......... 174/137 B |
| 6,404,095 | B1 | * | 6/2002 | Hsu ........................... 310/254 |
| 6,509,665 | B1 | * | 1/2003 | Nishiyama et al. ......... 310/215 |
| 6,515,394 | B2 | * | 2/2003 | Ueda et al. ................. 310/208 |
| 6,555,942 | B1 | * | 4/2003 | Hsu ........................... 310/208 |
| 6,590,310 | B2 | * | 7/2003 | Takano ...................... 310/254 |

FOREIGN PATENT DOCUMENTS

| JP | 61-214748 A | 9/1986 |
| JP | 2716286 B2 | 11/1997 |
| JP | 2000-197294 A | 7/2000 |
| JP | 2003164088 | * 6/2003 | ............ H02K/3/24 |

* cited by examiner

Primary Examiner—Burton S. Mullins
Assistant Examiner—Heba Elkassabgi
(74) Attorney, Agent, or Firm—Foley & Lardner LLP

(57) ABSTRACT

A stator for a motor is a segmented type including a plurality of stator segments. Each stator segment includes a core segment forming a stator core, a stator winding including a first winding wound in one direction on the core segment, and a second winding wound in the opposite direction on the core segment, and an insulating member interposed between the core segment and the stator winding. A connecting member is formed integrally in the insulating member, and arranged to electrically connect inner ends of the first and second windings to form a single continuous winding.

31 Claims, 33 Drawing Sheets

FIG.5
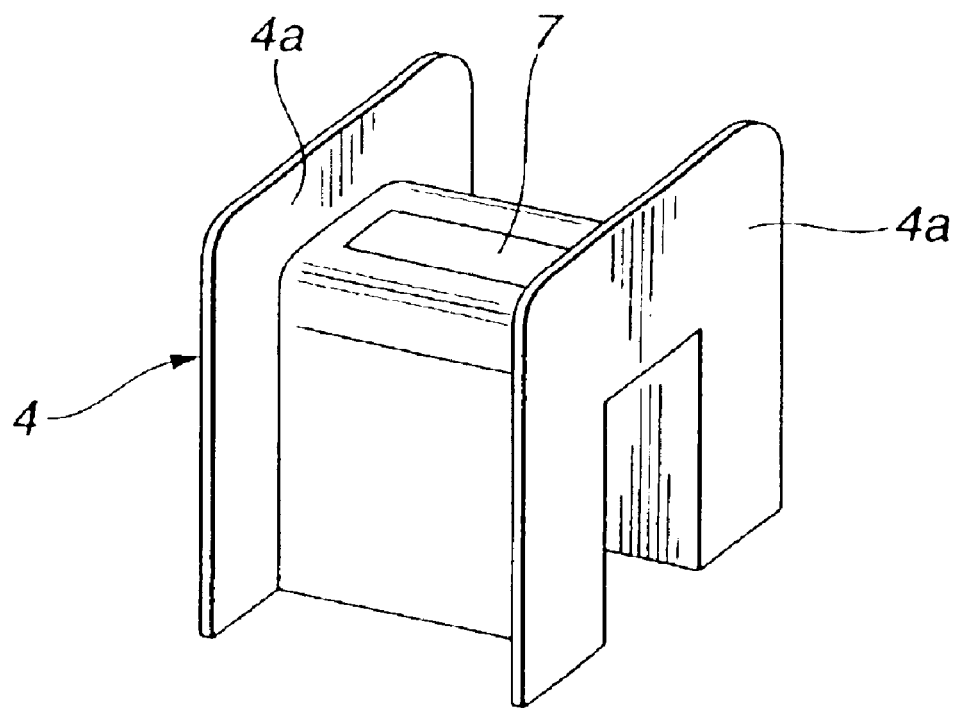
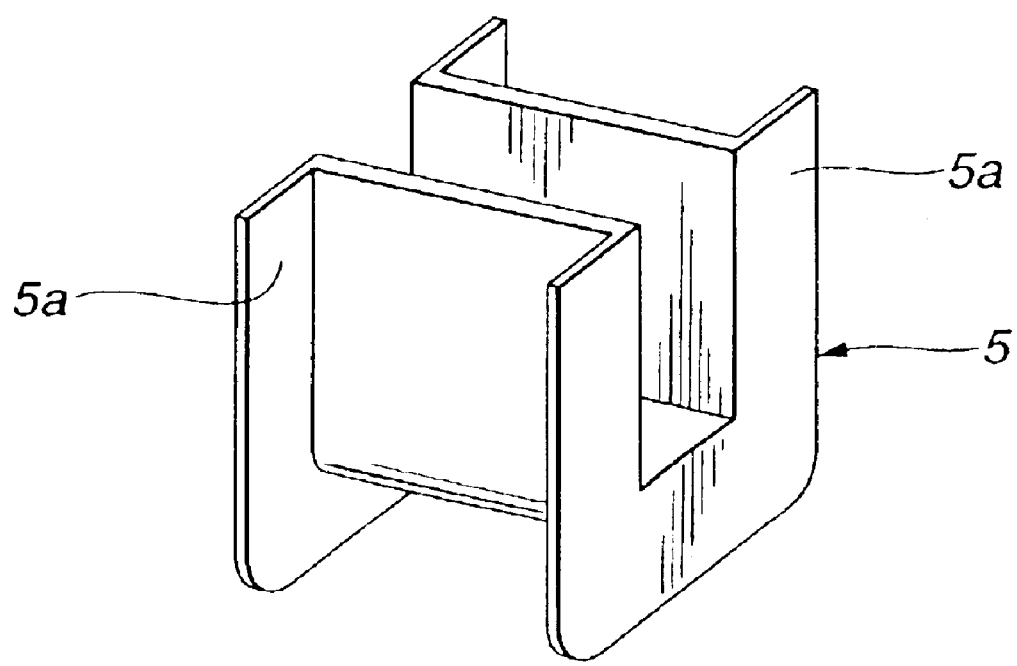

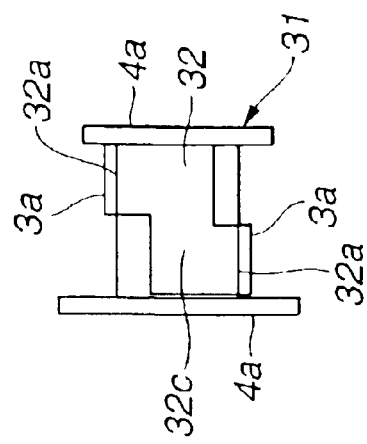
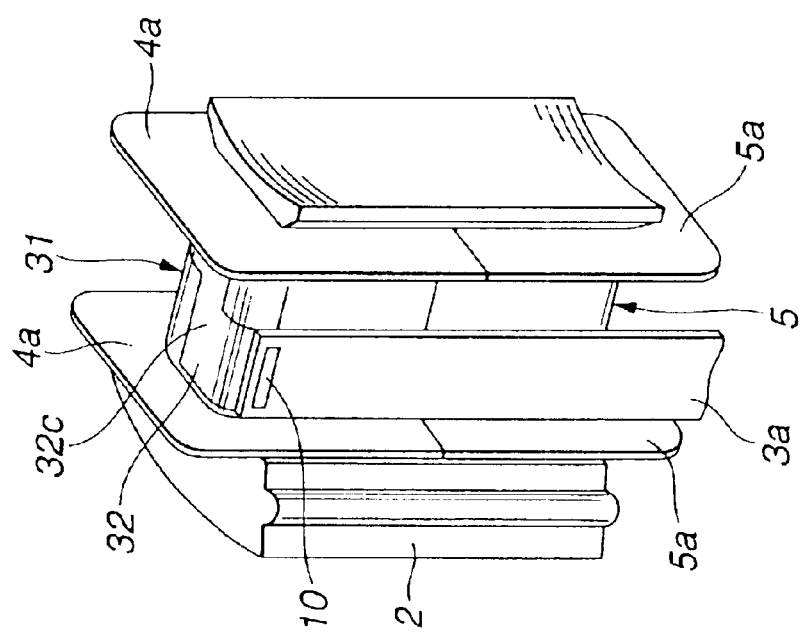
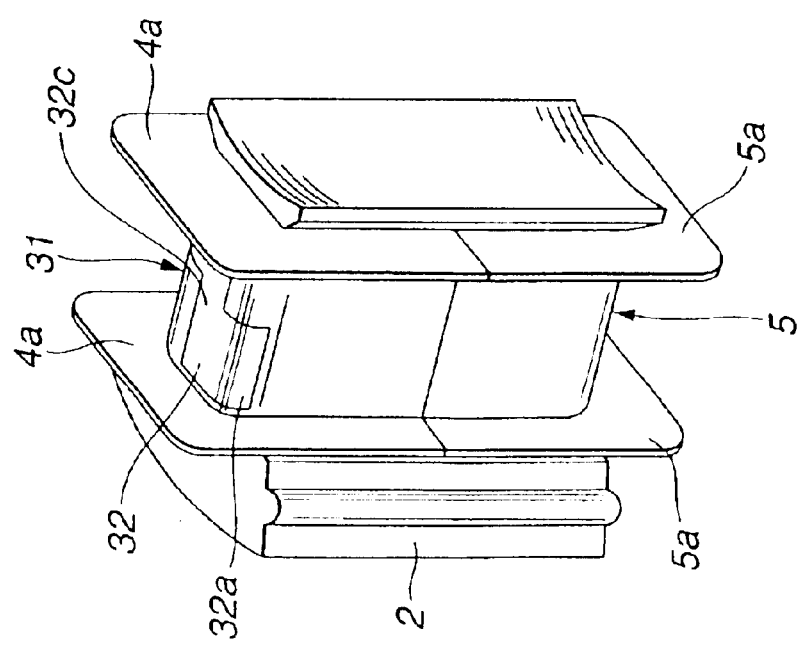

STATOR FOR MOTOR

BACKGROUND OF THE INVENTION

The present invention relates to structure and production process of a stator for a motor, and to structure and production process of a stator having sectional concentrated windings of flat wire.

Published Japanese Patent Application Publication No. 61(1986)-214748 discloses a motor coil structure including air core coils wound in different directions and connected together at coil ends.

Japanese Patent No. 2716286 and Published Japanese Patent Application Publication No. 2000-197294 show liquid cooling structures for cooling windings in stators.

SUMMARY OF THE INVENTION

In the case of a core of the sectional concentrated winding type, an insulating member is required for insulation between the core and winding. In this case, a conductor for connecting two adjacent windings is placed on a surface of the insulating member, and then wire is wound on the insulating member and the connecting member. Therefore, the connecting member causes a swell of winding on the connecting member, and thereby increase the size of the coil end. Moreover, the operation of winding a wire on the connecting member tends to cause the connecting member (even if received in a groove) to move out of place by the influence of wire tension.

The cooling structure shown in each of the above-mentioned Japanese documents is not necessarily sufficient to cool the inner region of windings.

It is an object of the present invention to provide structure and production process of a stator to prevent size increase of windings and to prevent undesired shift or removal of a connecting member. It is another object of the present invention to provide a stator to efficiently cool winding.

According to the present invention, a stator of a motor, comprises: a core segment forming a stator core; a stator winding including a first winding wound in one direction on the core segment, and a second winding wound in the opposite direction on the core segment; an insulating member interposed between the core segment and the stator winding; and a connecting member formed integrally in the insulating member, and arranged to electrically connect inner ends of the first and second windings to form a single continuous winding.

According to another aspect of the present invention, a process of producing a stator of a motor, comprises: forming an insulating member including a connecting member as an integral part; attaching the insulating member to a core segment forming a stator core; joining an inner end of a wire of a first winding of a stator winding to a first portion of the connecting member; winding the wire of the first wining on the insulating member around the core segment in one direction; joining an inner end of a wire of second winding of stator winding to a second portion of the connecting member; and winding the wire of the second winding on the insulating member around the core section in the opposite direction. According to still another aspect of the present invention, a stator comprises: an annular stator core including a plurality of core segments arranged in a circle with slots each formed between two adjacent core segments, each core segment including a salient pole portion covered with an insulating layer; a plurality of stator windings each being wound around the salient pole portion of a unique one of the core segments so that a coolant passage is formed; and a plurality of spacers each of which is inserted in a unique one of the slots, to abut against the stator windings on both sides.

The other objects and features of this invention will become understood from the following description with reference to the accompanying drawings.

BRIEF DESCRIPTION OF THE DRAWINGS

FIG. 5 is an exploded perspective view showing end caps of the stator segment shown in FIG. 2.

FIG. 10A is a perspective view showing a main portion, and FIG. 10B is a sectional view.

FIG. 11A is a perspective view showing a main portion, and FIG. 11B is a sectional view.

FIG. 12A is a perspective view showing a main portion, FIG. 10B is a perspective view showing the main portion in the state wire is wound, and FIG. 12C is a sectional view.

FIG. 13A is a perspective view showing a main portion, and FIG. 13B is a sectional view.

FIG. 14A is a perspective view showing a main portion, and FIG. 14B is a sectional view.

FIG. 15A is a perspective view showing a main portion, and FIG. 15B is a sectional view.

FIGS. 16A, 16B and 16C show a core segment according to a ninth embodiment. FIG. 16A is a perspective view showing a core segment before wire is wound, FIG. 13B is a perspective view showing the core segment after wire is joined to a connecting member, and FIG. 16C is a plan view of the core segment of FIG. 16B.

DETAILED DESCRIPTION OF THE INVENTION

Figure 1:
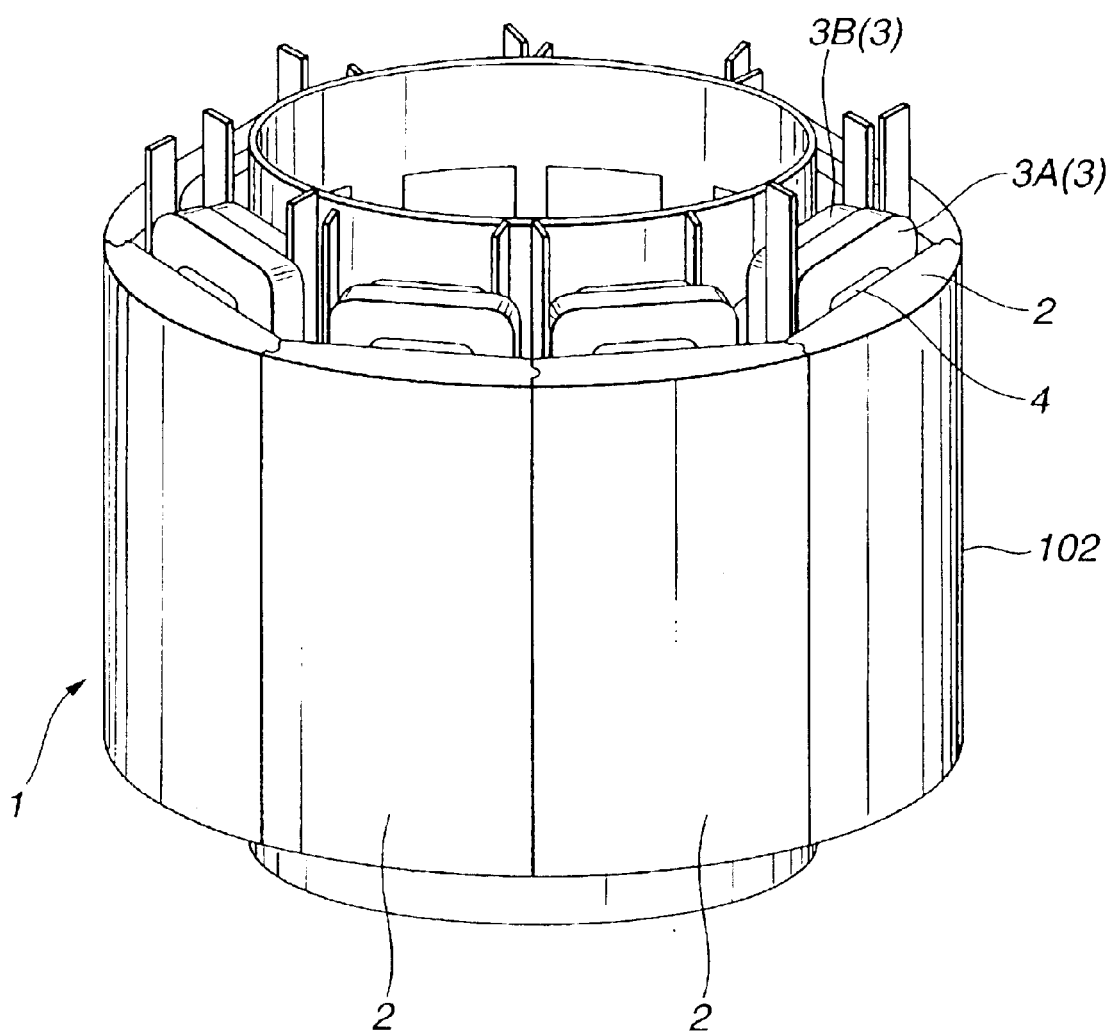
FIG. 1 is a perspective view showing a stator according to a first embodiment of the present invention in an assembled state.
Figure 2:
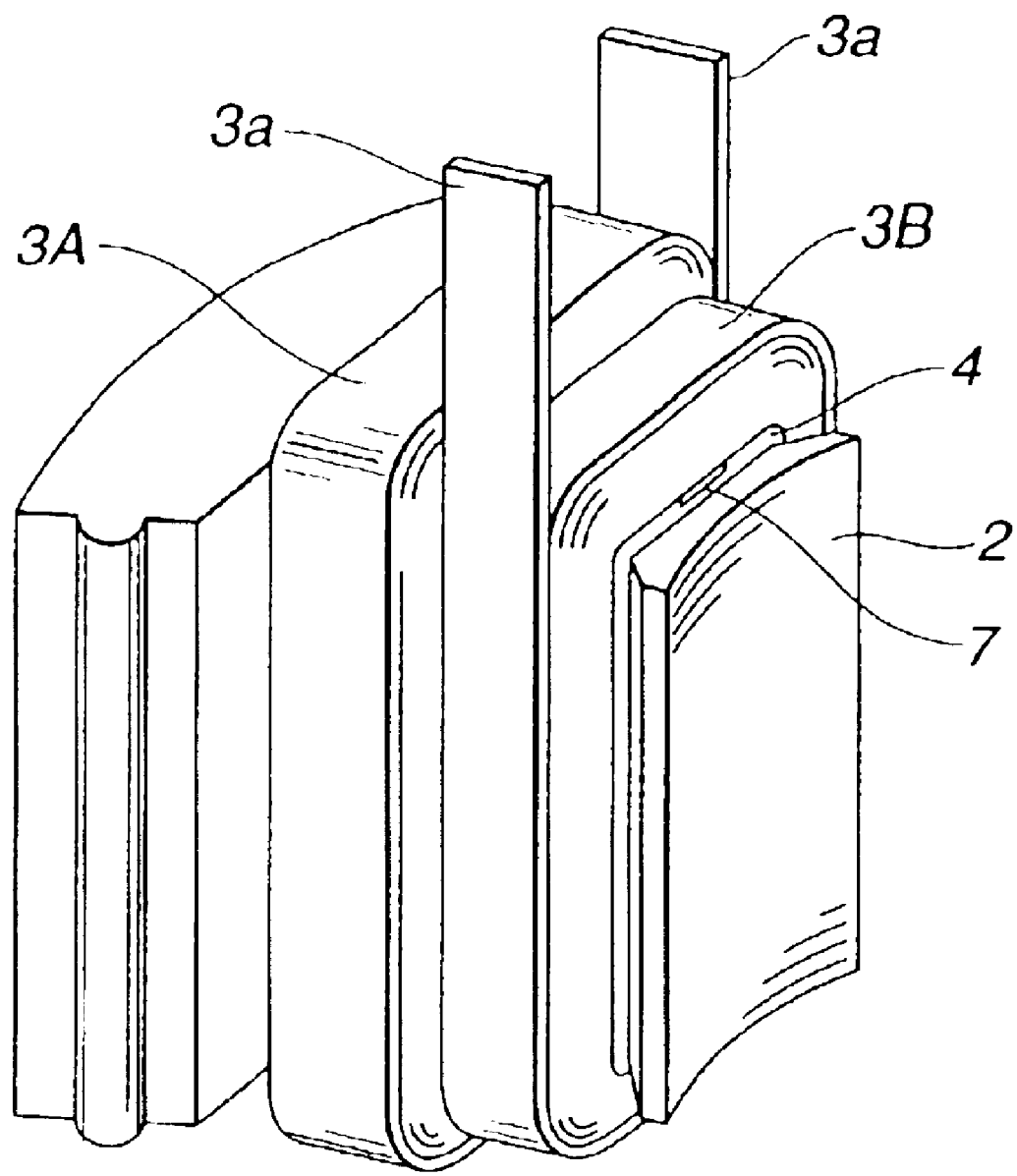
FIG. 2 is a perspective view showing one of stator segments constituting the stator of FIG. 1.

FIGS. 1~6 show a stator of a motor according to a first embodiment of the present invention. FIG. 1 shows a stator made up of a plurality of core segments in perspective, and FIG. 2 shows one core segment for one pole in a state having windings.

A stator 1 for a motor in the example shown in FIGS. 1 and 2 is of a segmented type including a plurality of stator segments each including a core segment 2 and a stator winding 3. Core segments 2 each corresponding to one pole are arranged in a circle, and form a segmented stator core 102 of an annular shape. As shown in FIG. 2, each stator winding 3 of this example includes two windings 3A and 3B of flat wires (or rectangular or ribbon wires) 3a covered with insulating film. These core segments 2 are arranged in an annular form, and assembled into the annular stator core 102.

Figure 3A:
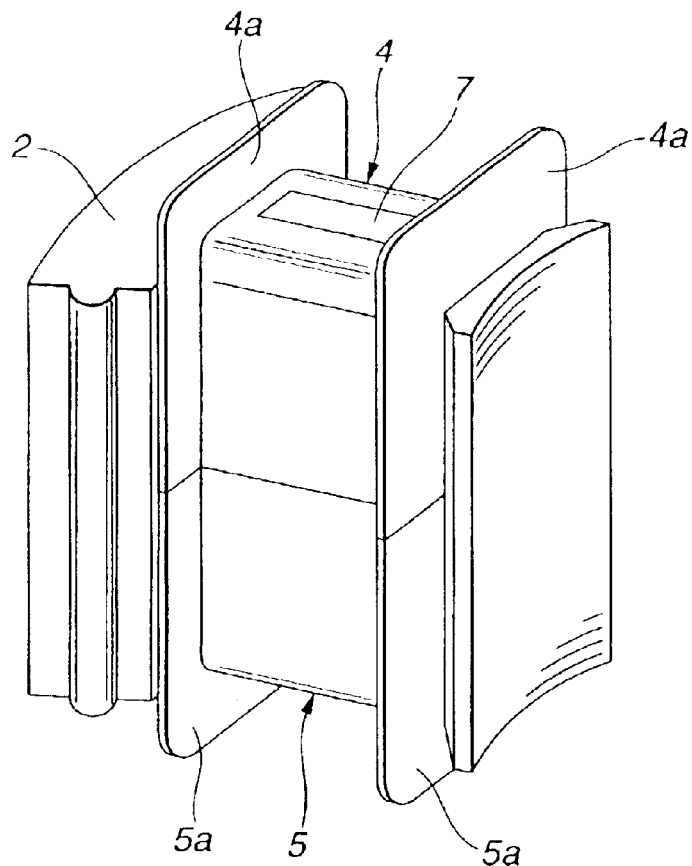
FIGS. 3A and 3B are perspective views showing a core segment of FIG. 2 in a state before wire is wound, and a connecting member.
Figure 4:
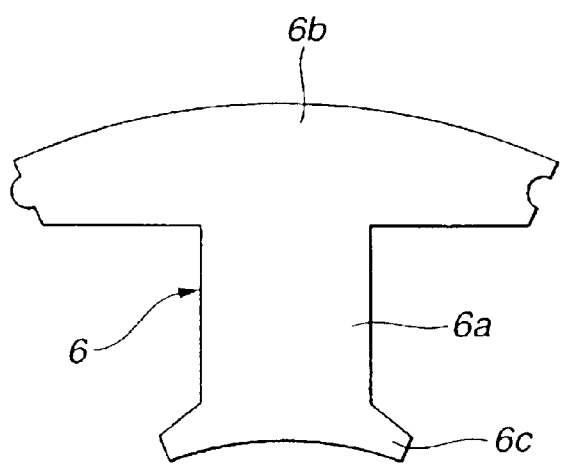
FIG. 4 is a view showing a piece of magnetic steel plate forming the core segment of FIG. 3A.

FIG. 3A shows one core segment 2 equipped with an insulating member including end caps 4 and 5. The insulating member is shaped like a bobbin. In the state of FIG. 3A, wire is not yet wound, and core segment 2 has no windings. Core segment 2 is a stack or laminate structure of flat magnetic steel plates 6 formed in a T shape as shown in FIG. 4, by die cutting or punching of steel sheet. As shown in FIG. 4, the T-shaped magnetic steel plate 6 has a middle portion (or tooth portion) 6a, an outer portion (or back tooth portion) 6b, and an inner portion 6c. Magnetic steel plates 6 in each stack are joined together by laser welding or staking on the side. Middle portions 6a and inner portions 6c form a salient pole portion of a core segment.

End caps 4 and 5 are saddle-shaped, as shown in FIG. 3A, and made of an insulating resin. End caps 4 and 5 are fit over the middle portion (6a) of the magnetic steel plate stack. In this state, end caps 4 and 5 are connected end to end to form the insulating member like a bobbin. Thus, insulating end caps 4 and 5 are arranged to cover the middle portion (6a) of each core segment 2 inclusive of coil end portions, and inside wall surfaces of each slot (109) formed between two adjacent core segments 2. Each of end caps 4 and 5 is formed integrally with flanges 4a or 5a, so that the insulating member has outward flanges placed between the outer portion (6b) and inner portion (6c) of the core segment. In FIGS. 1 and 2, flanges 4a and 5a are omitted to prevent windings 3A and 3B from being concealed.

Windings 3A and 3B in this example are flatwise coils arranged side by side. Winding direction of wire in first winding 3A is opposite to that of second winding 3B. The inner ends of windings 3A and 3B are electrically connected together by a connecting member or connecting member 7 shown in FIG. 3B. In a motor operating mode using this machine as a motor, if current is supplied from the outer end of first winding 3A, for example, current flows from the inner end of first winding 3A to the inner end of second winding 3B through connecting member 7, and reaches the outer end of second winding 3B. In this way, first and second windings 3A and 3B are connected together and adapted to function as a single winding. Current can flow in the reverse direction from the outer end of second winding 3B to the outer end of second winding 2A, through connecting member 7.

Figure 3B:
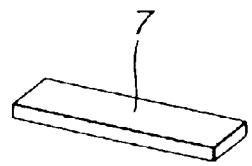

Connecting member 7 is formed integrally in end cap 4, as shown in FIGS. 3A and 3B. The outside surface of connecting member 7 is flush with the outside surface of end cap 4. In this example, connecting member 7 is embedded in resin end cap 4 during injection molding by placing connecting member 7 as an insert in a die. In this example, connecting member 7 is formed by cutting the flat wire 3a to a desired length. Insulating film is removed at least in a surface of connecting line 7 contacting with windings 3A and 3B. If the insulating performance of end caps 4 and 5 is sufficient, it is possible to use bare copper wire having no insulating layer as connecting member 7. If the insulating material is of a type, such as polyester insulating material of some kind, allowing a joining operation such as ultrasonic welding without removing insulating film, it is possible to embed connecting line 7 covered with insulating film directly in end cap 4.

End cap 4 inlaid with connecting member 7 and the other end cap 5 are attached to the middle portion (6a) of core segment 2, so that end caps 4 and 5 are connected end to end. Then, each core segment 2 is held in a winding machine with a clamp, and rotated. According to the need, an insulating film is preliminarily removed from an inner starting end of the wire 3a of each winding 3A and 3B with wire brush or grinding stone, and the bared inner starting end of wire 3a is put in contact with connecting member 7 of end cap 4.

Figure 6:
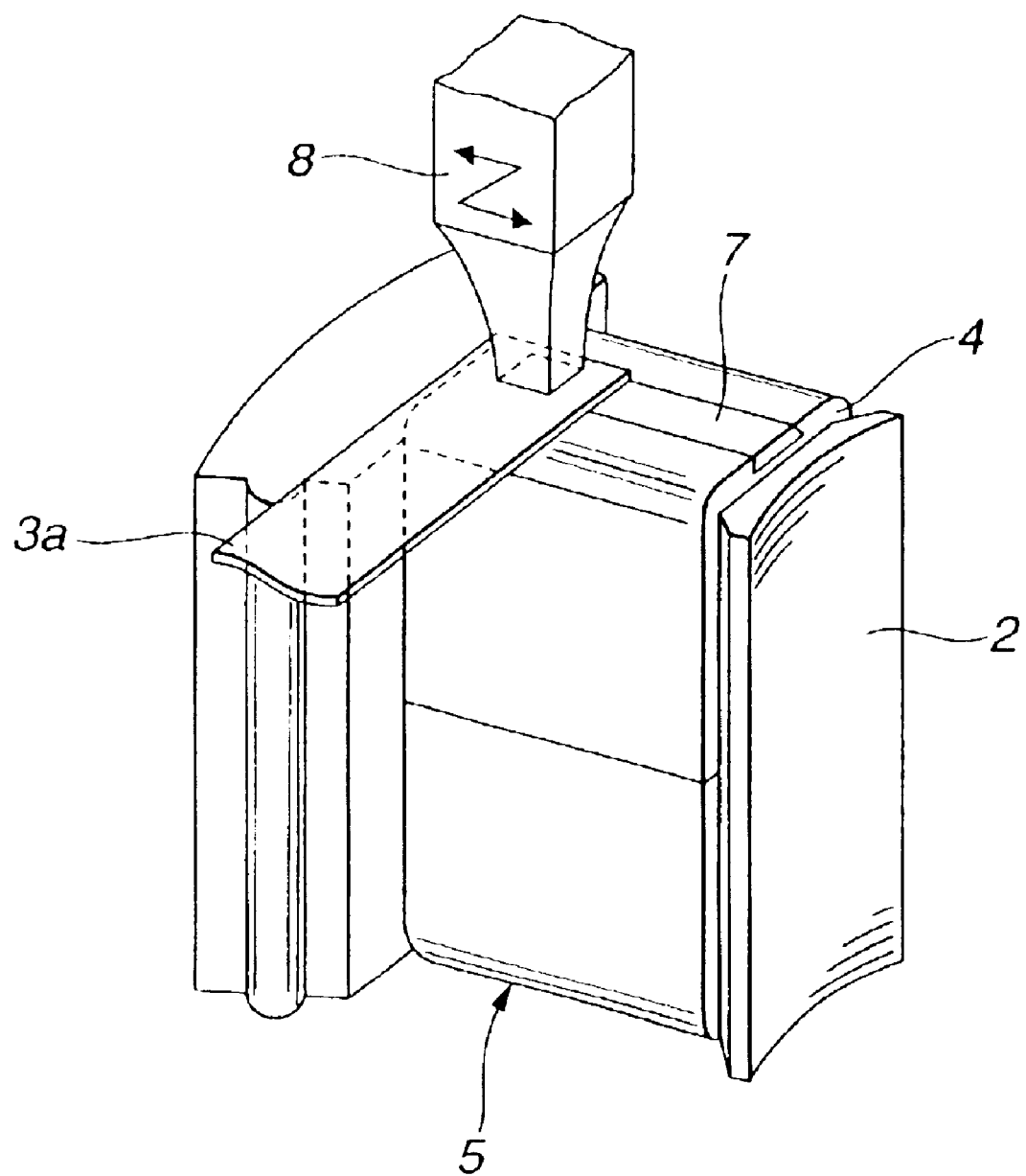
FIG. 6 is a perspective view showing an operation of joining a flat wire to the connecting member shown in FIG. 3A.

FIG. 6 shows a horn 8 for ultrasonic welding to connect the inner starting end of wire 3a and connecting member 7. The inner starting end of wire 3a is set to connecting member 7 inlaid in end cap 4, and horn 8 of ultrasonic welding machine is pressed to connecting member 7 through the inner starting end of wire 3a in a joint region. In this state, the inner starting end of wire 3a is joined to connecting member 7 in the form of lap joint by producing ultrasonic vibrations. Thereafter, wire 3a is wound around core segment 2 repeatedly by rotating core segment 2 and wire 3a relatively to each other in a flatwise manner until first winding 3A is completed. In this case, a force trying to move connecting member 7 off the end cap 4 is applied to connecting member 7. However, connecting member 7 inlaid in end cap 4 can readily withstand such a force. Connecting member 7 is set at the same level of the surface of end cap 4. The bared surface of connecting member 7 is flush with the end surface of end cap 4. This configuration is effective in preventing partial swelling of winding (3A) and in reducing the size of coil end portion.

After the operation of first winding 3A, wire 3a is wound in the opposite winding direction to form second winding 3B in the same manner. In this way, first and second windings 3A and 3B are formed as shown in FIG. 2. In this example, end caps 4 and 5 are arranged to cover the entirety of the middle portion (6a) of each core segment. However, it is optional to form end caps 4 and 5 only in the coil end portions, and to employ insulating paper or other insulating material, in place of the end caps, for the inside wall surfaces of the slots.

In each slot (109) formed between the salient pole portions of two adjacent core segments 2, there are provided a spacer (such as spacer 120, 130, 140, 150, 160, or 170) arranged to block an interspace formed between the stator windings of the two adjacent core segments 2; and a closing member (such as item 111) arranged to close a radial inner inlet portion of the slot. Moreover, it is possible to form a coolant passage (such as item 108) in the stator winding, for cooling the stator winding.

The first embodiment of the present invention can provide the following effects. First, connecting member 7 is preliminarily set in end cap 4 in a flush state without projecting from end cap 4 and without requiring an area to occupy. This configuration is effective in forming windings 3A and 3B without creating swelling, and advantageous for size reduction in the coil end portions. Second, connecting member 7 is fixed to end cap 4 by forming connecting member 7 and end cap 4 into an integral unit. Therefore, connecting member 7 is secured at a correct position in end cap 4 during an operation of winding wire 3a without peeling off or without shifting, so that the reliability is improved.

Figure 7A:
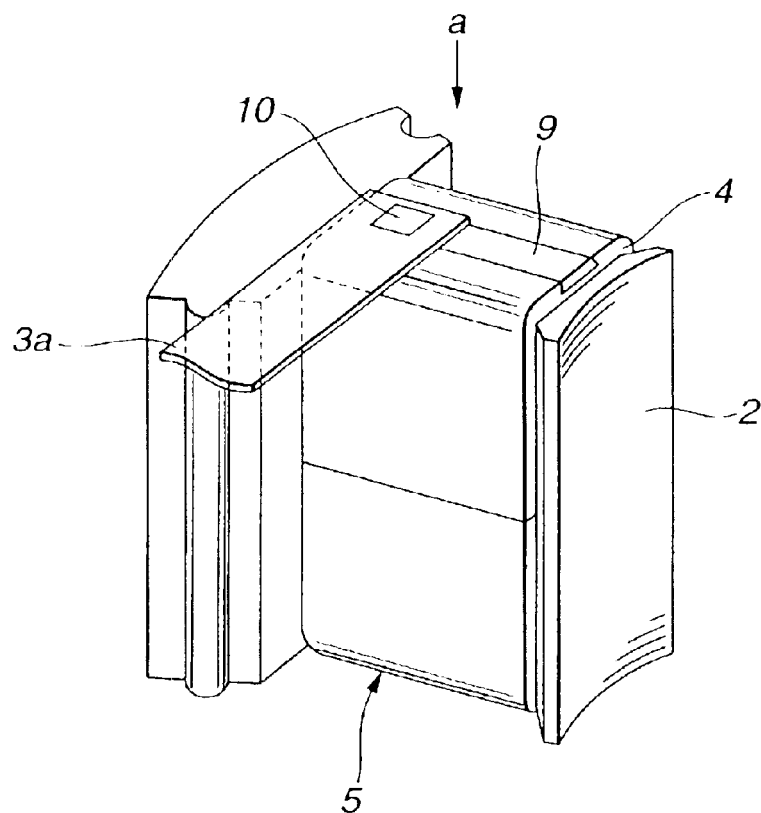
FIGS. 7A and 7B are perspective views showing a core segment before wire is wound, and a connecting member according to a second embodiment of the present invention.

FIGS. 7A, 7B, 8A and 8B show a second embodiment of the present invention. The construction is almost the same as that of the first embodiment, and the same reference numerals are used for identical parts. In FIG. 7A, too, flanges 4a and 5a of end caps 4 and 5 are omitted for the sake of convenience.

As shown in FIG. 7A, a connecting member 9 is embedded in end cap 4 so as to form a continuous flush surface as in the first embodiment. Connecting member 9 according to the second embodiment has at least one protruding portion protruding outward beyond a bared surface of connecting member 9 when viewed from a direction a in FIG. 7A, perpendicular to the bared surface. Protruding portion is buried in end cap 4 in a manner to prevent removal of connecting member 9 from end cap 4.

Figure 7B:
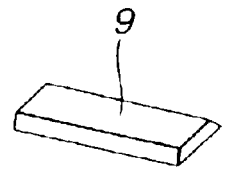

In the example shown in FIGS. 7A and 7B, connecting member 9 has a narrower flat upper surface in the shape of a rectangle having a smaller width, and a broader flat lower surface which is in the shape of a rectangle having a larger width than that of the upper surface and which is parallel to the upper surface, and the cross section of connecting member 9 is in the form of a trapezoid having two parallel sides. The narrower upper surface of connecting member 9 is bared in the surface of end cap 4 at the same level, and the broader lower surface is buried in end cap 4. Connecting member 9 has at least one tapering or sloping side surface extending outward from the narrower upper surface so as to form a triangular protruding portion. In this example, connecting member 9 has two tapering or sloping side surfaces extending outwards in the opposite directions from the narrower upper surface. Thus, connecting member 9 of this example is shaped in a manner of undercut to prevent extraction from end cap 4. It is possible to produce such a trapezoidal connecting member 9 by machining into a trapezoidal cross section, or by producing a wire by drawing through a trapezoidal die. As shown in FIG. 7A, the inner starting end of flat wire 3a is joined to one side of connecting member 9 in a joint region 10 by ultrasonic welding. Trapezoidal connecting member 9 can improve the effect of preventing removal from end cap 4.

Figure 8A:
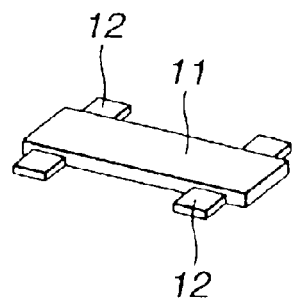
FIGS. 8A and 8B are perspective views showing variations of the connecting member shown in FIG. 7B.
Figure 8B:
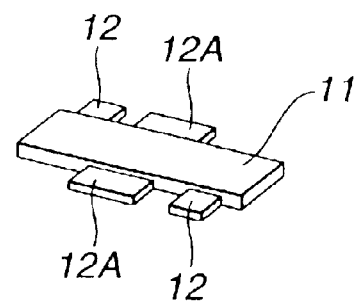

FIGS. 8A and 8B show variations of the second embodiment. In the example of FIG. 8A, a connecting member 11 having a rectangular cross section is formed with four protruding portions 12 protruding from the sides of connecting member 11 in two opposite directions. Protruding portions 12 is formed below the upper surface of connecting member 11, and buried in end cap 4. In the example of FIG. 8B, connecting member 11 is formed with middle wider protruding portions 12A protruding outwards from a middle of the length of connecting member 11 between the two longitudinal ends of connecting member 11. Protruding portions 12A are buried in end cap 4 at a middle position between first and second windings 3A and 3B. In the example of FIG. 8A, there are two terminal protruding portions 12 projecting outward in opposite directions near a first longitudinal end of connecting member 11 and two terminal protruding portions projecting outward in opposite directions near a second longitudinal end of connecting member 11. In the example of FIG. 8B, there are two terminal protruding portions 11. The first terminal protruding portion 12 projects in one direction near the first longitudinal end of connecting member 11, and the second terminal protruding portion 12 projects in the opposite direction near the second longitudinal end of connecting member 11.

The buried protruding portion or portions of the connecting member 11 according to the second embodiment can secure connecting member by preventing connecting member 11 from being extracted from end cap 4 by the tension of wire 3a. Wider protruding portions 12A increase the cross section area of connecting member 11 connecting first and second windings 3A and 3B, so that the strength of the connecting structure is improved, and the electric resistance is reduced to the advantage of reduction of loss.

Figure 9:
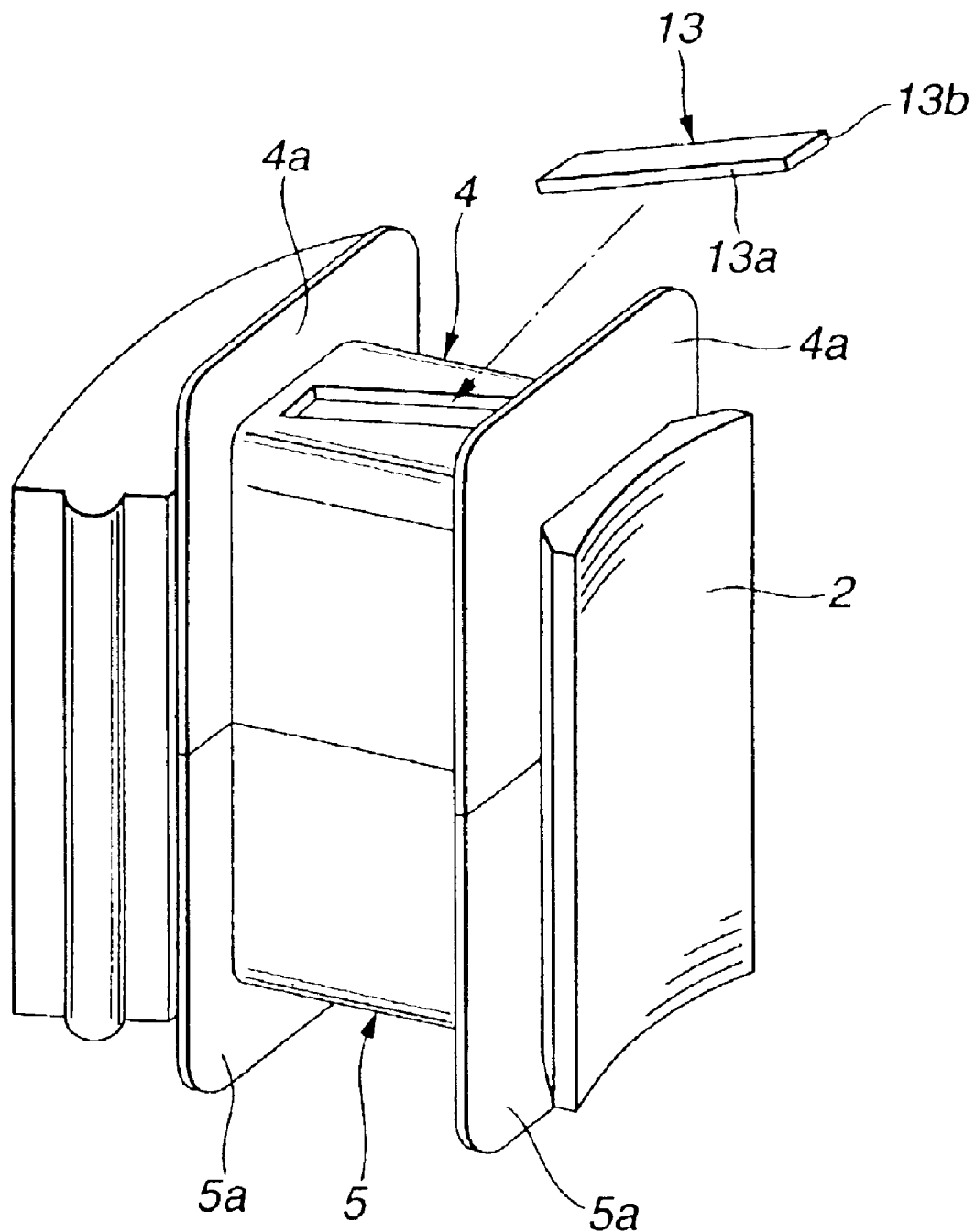
FIG. 9 is an exploded perspective view showing a core segment according to a third embodiment in a state before wire is wound.

FIG. 9 shows a third embodiment of the present invention in which a connecting member 13 is placed obliquely with respect to a winding axis about which first and second windings 3A and 3B are wound. The longitudinal direction of connecting member 13 is not parallel to the winding axis of first and second windings 3A and 3B. Connecting member 13 has at least one side surface 13a extending obliquely with respect to the winding axis, or the radial direction of the annular stator 1 shown in FIG. 1. The outside surface of connecting member 13 is flush with the outside surface of end cap 4 as in the preceding embodiments.

In the example shown in FIG. 9, connecting member 13 is not rectangular but in the shape of a parallelogram having two long parallel sides extending obliquely and two short parallel sides. In the example of FIG. 9, the two parallel short sides extend in parallel to outward flanges 4a to which the winding axis is perpendicular. Connecting member 13 of this example is produced by machining into the shaped of oblique parallelogram, and formed integrally in end cap 4 by insert molding for producing the end cap 4.

The oblique side surface 13a need not extend over the entire length of connecting member 13. Connecting member 13 according to this embodiment may at least one obliquely extending surface extending in a direction not parallel to the winding axis of first and second windings 3A and 3B, along a length equal to or smaller than the length of connecting member 13. In consideration of the reduction of copper loss due to an increase in the cross sectional size of connecting member 13, the length of the obliquely extending surface is equal to or greater than 50% of the length of connecting member 13.

When wire 3a is wound around end caps 4 and 5, the obliquely extending connecting member 13 according to the third embodiment can help disperse a force applied by the tension of wire 3a up to the longitudinal ends 13b. Therefore, obliquely extending connecting member 13 functions to increase the pressure receiving area, and thereby to prevent breakage of end cap 4 and removal of connecting member 13. Connecting member 13 having two parallel oblique side surfaces 13a is advantageous in decreasing the distance between windings 3A and 3B and reducing copper loss. The magnetic flux produced by oblique connecting member 13 is not perpendicular to the main magnetic flux, but in a direction not so detrimental to the main flux, so that the magnetic characteristic of windings 3A and 3B can be improved.

Figure 10A:
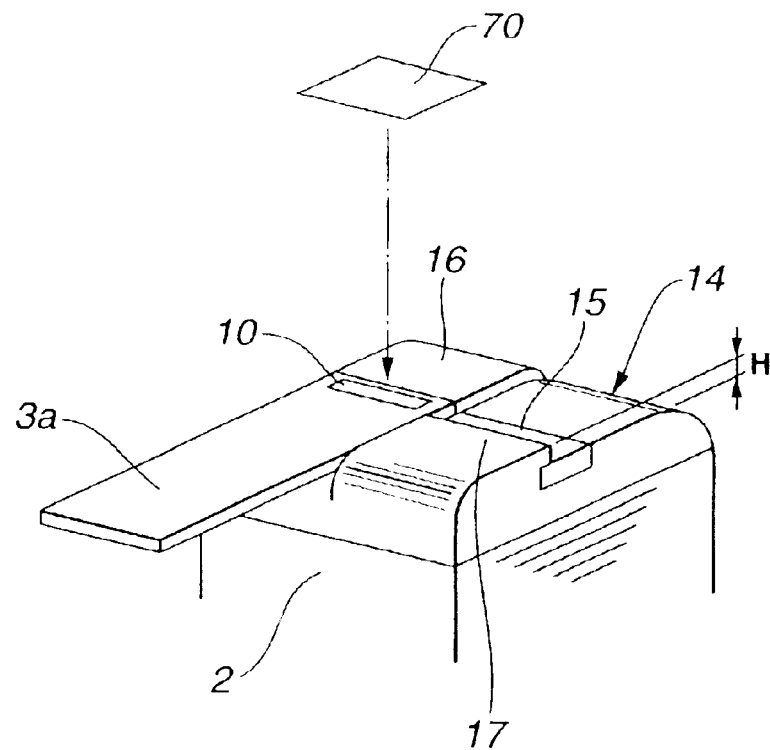
FIGS. 10A and 10B show a core segment according to a fourth embodiment.
Figure 10B:
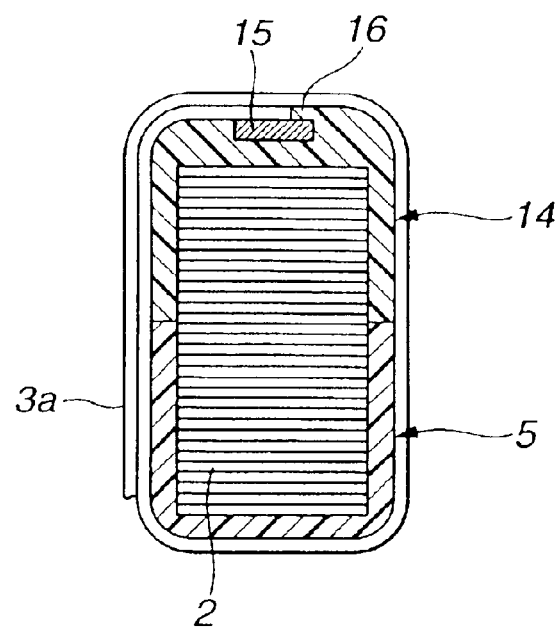

FIGS. 10A and 10B shows a fourth embodiment. Outward flanges 4a and 5a are omitted in these figures. In the fourth embodiment, end cap 14 (corresponding to end cap 4 of the preceding embodiments) is formed with at least one projection (16 or 17) for confronting the inner starting end of wire 3a.

In the example of FIGS. 10A and 10B, end cap 14 includes a first projection 16 for confronting the inner starting end of first winding 3A and a second projection 17 for confronting the inner starting end of second winding 3B. First projection 16 is formed on a first side of a connecting member 15, and second projection 17 is formed on a second side of connecting member 15. The inner starting end of wire 3a of first winding 3A abuts against an upright abutment surface of first projection 16 formed on the first side (the right side as shown in FIG. 10B). On the second side (the left side as viewed in FIG. 10B), the wire 3a of first winding 3A extends, away from first projection 16, on the bared upper surface of connecting member 15 and the flat upper surface of end cap 14 flush with the bared upper surface of connecting member 15. Similarly, the inner starting end of wire 3a of second winding 3B abuts against an upright abutment surface of second projection 17 formed on the second side (the left side as viewed in FIG. 10B). On the first side (the right side as viewed in FIG. 10B), the wire 3a of second winding 3B extends, away from second projection 17, on the bared upper surface of connecting member 15 and the flat upper surface of end cap 14 flush with the bared upper surface of connecting member 15. The height H of each of first and second projections 16 and 17 is equal to or slightly greater than the thickness of flat (or rectangular) wire 3a. Each of first and second projections 16 and 17 has a step defined by the abutment surface extending vertically from the bared surface of connecting member 15. In the example shown in FIGS. 10A and 10B, each of first and second projections 16 and 17 projects slightly over connecting member 15 so as to press down connecting member 15 and to prevent removal of connecting member 15. In the case of first projection 16, first projection 16 projects leftward as viewed in FIG. 10b over connecting member 15 so as to prevent upward movement of connecting member 15.

End cap 14 formed with first and second projections 16 and 17 is attached, together with the other end cap 5, to core segment 2. Then, the inner end of wire 3a for first winding 3A bared by peeling off the insulator film is placed on connecting member 15, and put to the abutment surface of first projection 16. In this set state, the bared inner end of wire 3a is joined to the outer half of connecting member 15 by ultrasonic welding with a horn pressed to a joint region 10. Thereafter, wire 3a is wound with tension around end caps 14 and 5 to form first winding 3A. Second winding is wound in the opposite direction in the same manner.

Figure 11A:
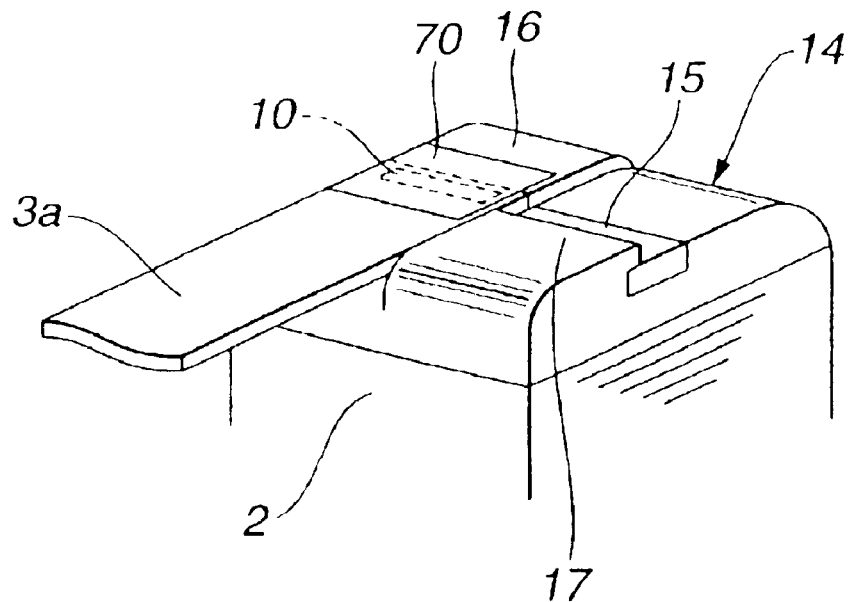
FIGS. 11A and 11B show a variation of the core segment shown in FIGS. 10A and 10B.
Figure 11B:
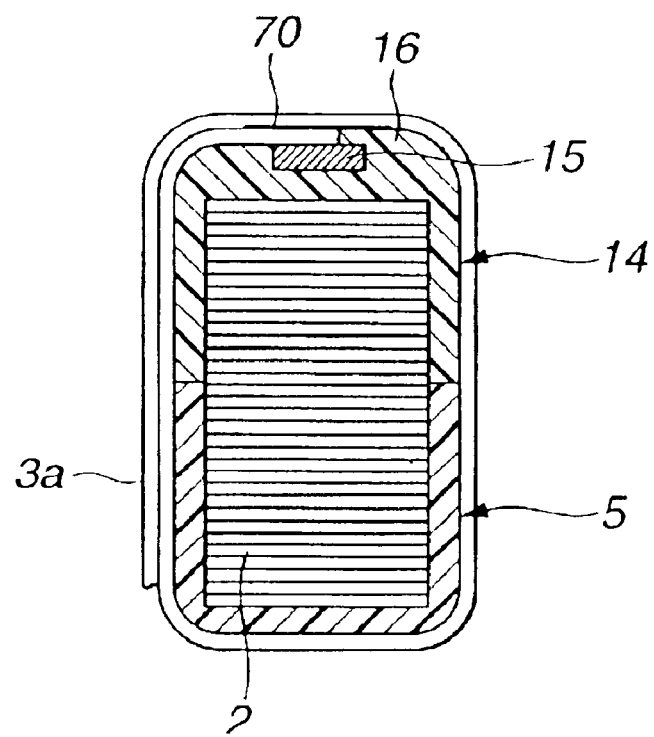

Projections 16 and 17 of end cap 14 function to prevent connecting member 15 from being separated from end cap 14 in an operation to wind wire 3a around end caps 14 and 5 by applying a tension. Even if burrs are left at the inner end of wire 3a after cutting operation, the projection 16 or 17 functions to protect wire 3a in a second turn extending on the inner end against burrs by raising the position of wire 3a in the second turn by the height H. In another example shown in FIGS. 11A and 11B, an insulating film 70 is stuck on the inner end of wire 3a and projection 16 so as to cover the joint region 10 to further improve the insulating performance in high voltage devices and other devices requiring higher insulating ability. Insulating film 70 is sandwiched between the inner end of wire 3a in the first turn, and a section of wire 3a wound in the second turn on the inner end, so as to reinforce the insulation. Insulating film 70 can be interposed in second winding 3B in the same manner. Instead of insulating film 70, it is optional to form an insulating layer similar to insulating film 70 by applying insulating adhesive paste.

Figure 12A:
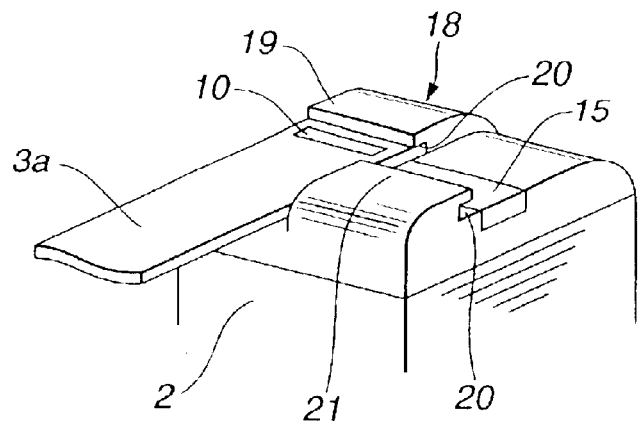
FIGS. 12A, 12B and 12C show a stator segment according to a fifth embodiment.
Figure 12B:
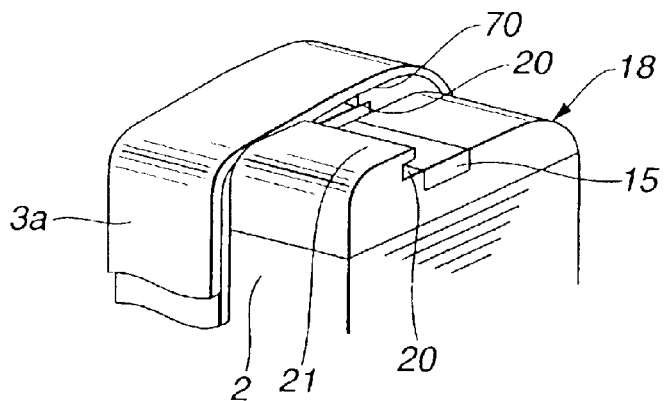
Figure 12C:
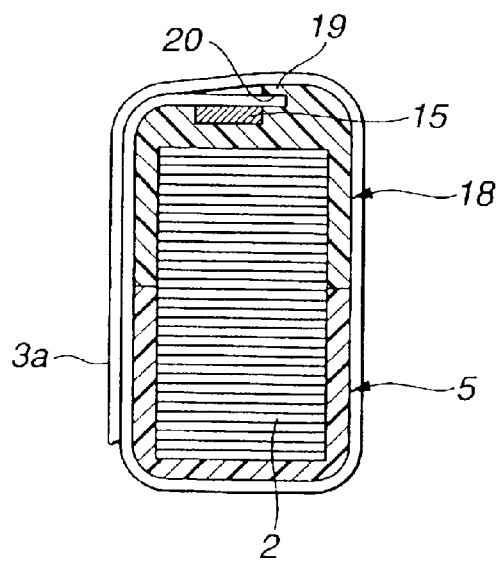

FIGS. 12A, 12B and 12C show a fifth embodiment. In the fifth embodiment, an end cap 18 (similar to end cap 14 of the fourth embodiment) is formed with at least one projection (19 or 21) having a groove 20 for receiving the inner starting end of wire 3a.

In the example shown in FIG. 12A, end cap 18 includes a first projection 19 having a groove 20 opening in a first direction (the leftward direction as viewed in FIG. 12C) in an upright wall surface (similar to the abutment surface in the fourth embodiment) on a first side (the right side as viewed in FIG. 12C) of connecting member 15 formed integrally in end cap 18, and a second projection 21 having a groove 20 opening in a second direction (the rightward direction as viewed in FIG. 12C) in an upright wall surface (similar to the abutment surface in the fourth embodiment) on a second side (the left side as viewed in FIG. 12C) of connecting member 15. The inner starting end of wire 3a of first winding 3A is inserted into groove 20 of first projection 19. On the second side (the left side as viewed in FIG. 12C), the wire 3a extends away from first projection 19 on the bared upper surface of connecting member 15 and the flat upper surface of end cap 18 flush with the bared upper surface of connecting member 15. Similarly, the inner starting end of wire 3a of second winding 3B is inserted into groove 20 of second projection 21. On the first side (the right side as viewed in FIG. 12C), the wire 3a extends away from second projection 21 on the bared upper surface of connecting member 15 and the flat upper surface of end cap 18 flush with the bared upper surface of connecting member 15. The upright surface of first projection 19 rises upright from the first side of connecting member 15 and the upright surface of second projection 19 rises upright from the second side of connecting member 15.

The inner end of wire 3a for first winding 3A with the insulator film partly removed to bare the joint surface is placed on connecting member 15 and inserted into groove 20 of first projection 19. In this set state, the inner end of wire 3a is joined to the outer half of connecting member 15 by ultrasonic welding. Thereafter, wire 3a is wound with tension around end caps 18 and 5 to form first winding 3A. Second winding 3B is wound in the opposite direction in the same manner.

First, the groove 20 of end cap 18 for each winding according to the fifth embodiment can prevent the inner end of wire 3a from being warped or bent by the influence of pressure and heat in the case of ultrasonic welding with a horn applying ultrasonic vibrations to the joint region 10, and thereby eliminate the possibility of dielectric breakdown by interference between the warped inner end of wire 3a, and the wire section of the second turn. Second, projection 19 or 21 slightly raises the wire section of the second turn and thereby prevents direct contact with the inner end of wire 3a, so that the insulating performance is improved. Third, the height of projections 19 and 21 is greater than the thickness of flat wire 3a. Accordingly, there is formed a clearance, as shown in FIG. 12C, between the inner end of wire 3a on the joint region 10 and the wire section wound on the inner end in the second turn, so that the insulating performance can be improved. In this case, it is optional to form an insulating layer in this clearance by a coating of insulating adhesive or an insulating film 70 to further improve the insulting performance, as shown in FIG. 12B. Fourth, in the case of windings 3A and 3B being molded with resin, the resin can flow into the clearances formed by projections 19 and 21, and contribute to the formation of a secure insulating structure with the improved flowability.

Figure 13A:
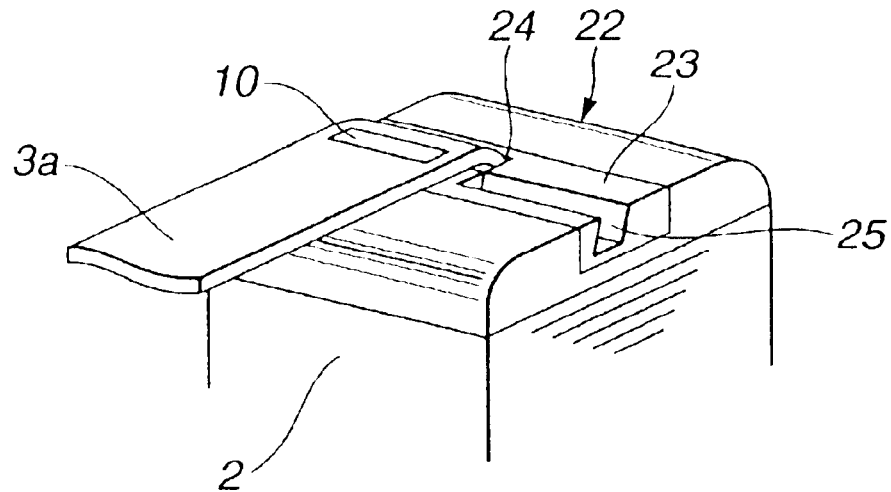
FIGS. 13A and 13B show a core segment according to a sixth embodiment.
Figure 13B:
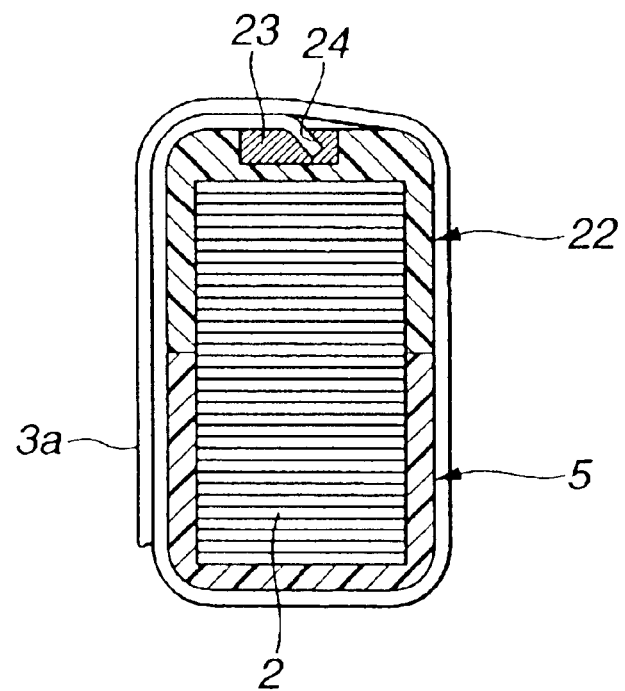

FIGS. 13A and 13B shows a sixth embodiment with the same reference numerals as in FIGS. 10A and 10B for identical parts. In the sixth embodiment, a connecting member 23 to be formed integrally in an end cap 22 is formed with first and second slant grooves 24 and 25 for receiving the inner starting ends of wires 3a of first and second windings 3A and 3B. First and second slant grooves 24 and 25 are inclined in opposite directions. In each groove 24 or 25, the inner end section of wire 3a inserted in the groove is bent so as to form an obtuse angle with the adjacent section of wire 3a placed on the upper surface of connecting member 23. It is possible to form these grooves 24 and 25 by machining. Alternatively, it is possible to form the entirety of connecting member 23 by casting into the shape having grooves 24 and 25.

The insulating film is preliminarily removed from wire 3a at least in a region for contacting with connecting member 23. Then, the inner end of wire 3a is inserted into groove 24 of connecting member 23, and bent so that the bared section is placed on the upper surface of connecting member 23. In this state, wire 3a is joined to connecting member 23 in the joint region 10 by ultrasonic welding. Then, wire 3a is wound around end caps 22 and 5 to form first winding 3A, and an insulating film 70 is interposed at the beginning of the second turn as in the example shown in FIG. 12B. Second winding 3B is wound in the same manner by first inserting the inner end of wire 3a into slant groove 25.

Grooves 24 and 25 may be inclined so as to form an acute angle, instead of an obtuse angle, between the inner end of wire 3a inserted into the groove, and the adjacent wire section 3a placed on the upper surface of connecting member 23. Groove 24 is formed in an outer first side quarter of rectangular connecting member 23, and the outer second side quarter has an upper flat surface flush with the upper surface of end cap 22. The joint region 10 for first winding 3A is in the outer second side quarter of connecting member 23. Groove 25 is formed in an inner second side quarter of rectangular connecting member 23, and the inner first side quarter has an upper flat surface flush with the upper surface of end cap 22. The joint region 10 for second winding 3B is in the inner first side quarter of connecting member 23. As viewed in FIG. 13B, the first side is the right side, and the second side is the left side.

In the sixth embodiment, first, grooves 24 and 25 prevent flat wire 3a in the second and subsequent turns from being injured by burrs formed at the inner end when cutting. Second, without the need for forming projections shown in FIGS. 11A~12C, end cap 22 is simple in construction, and easy to form. Moreover, this configuration can reduce the size of the coil end portion, and contribute to improvement in the motor performance. Third, the inner end of wire 3a is inserted in groove 24 or 25, and bent, so that wire 3a is attached to connecting member 23 snugly, and firmly in a correct position.

Figure 14A:
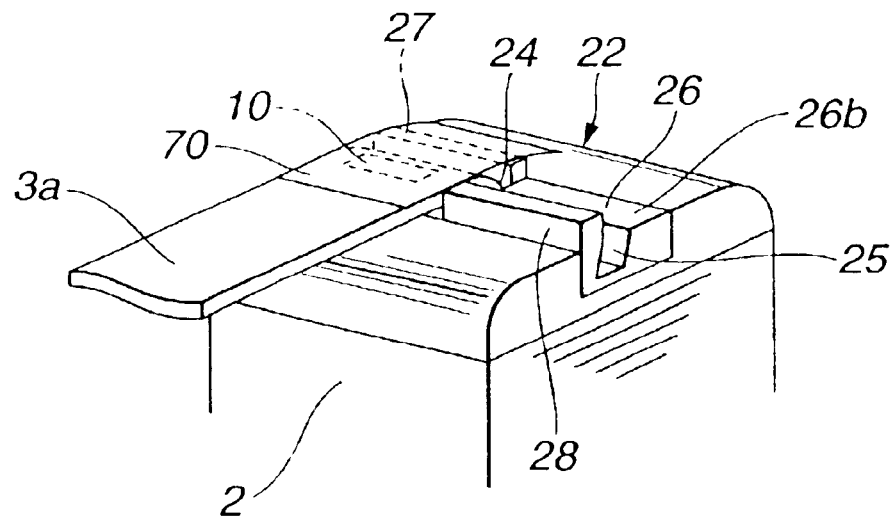
FIGS. 14A and 14B show a core segment according to a seventh embodiment.
Figure 14B:
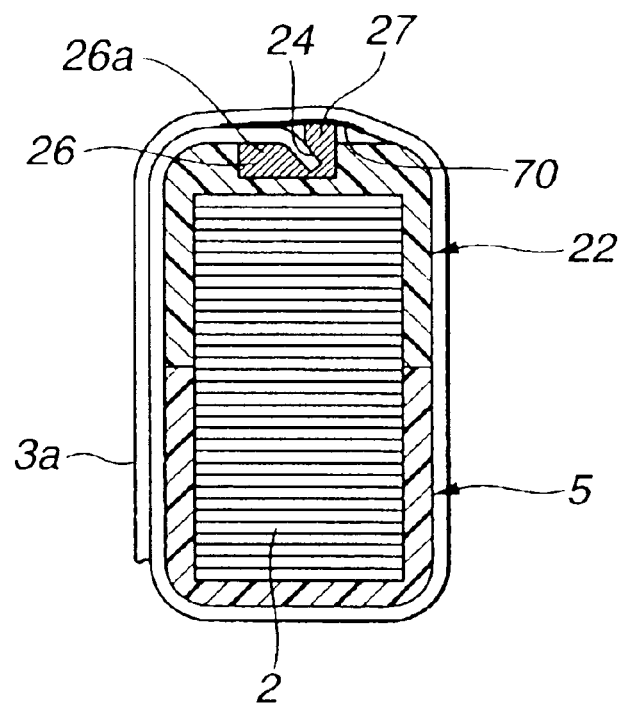

FIGS. 14A and 14B show a seventh embodiment with the same reference numerals as in FIGS. 13A and 13B for identical parts. A connecting member 26 is formed with first and second projections 27 and 28 adjacent to slant grooves 24 and 25. The height of projections 27 and 28 is sufficiently greater than the thickness of flat wire 3a. Thus, the outer half of connecting member 26 includes slant groove 24, projection 27 on the first side (the right side as viewed in FIG. 14B) of groove 24 and a flat (non-projecting) portion 26a having a flat contact surface on the second side (the left side as viewed in FIG. 14B). Similarly, the inner half of connecting member 26 includes slant groove 25, projection 28 on the second side (the left side as viewed in FIG. 14B) of groove 25 and a flat (non-projecting) portion 26b having a flat contact surface on the first side (the right side as viewed in FIG. 14B). The flat contact surfaces are flush with the upper surface of end cap 22.

In the seventh embodiment, first, grooves 24 and 25 prevent flat wire 3a in the second and subsequent turns from being injured by burrs formed at the inner end when cutting as in the sixth embodiment. Second, projection 27 or 28 slightly raises the wire section of the second turn and thereby produce a clearance to prevent direct contact with the inner end of wire 3a, so that the insulating performance is improved. The effect is further increased if an insulating layer is formed in the clearance by a coating of insulating adhesive or an insulating film as in the example of FIG. 12B. Third, in the case of windings 3A and 3B being molded in resin, the resin can flow into the clearances formed by projections 27 and 28, and contribute to the formation of a secure insulating structure with the improved flowability.

Figure 15A:
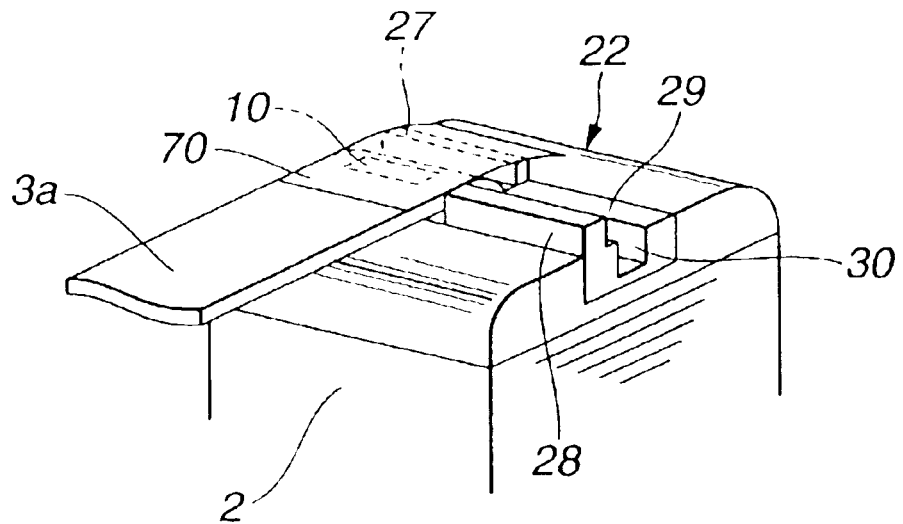
FIGS. 15A and 15B show a core segment according to an eighth embodiment.
Figure 15B:
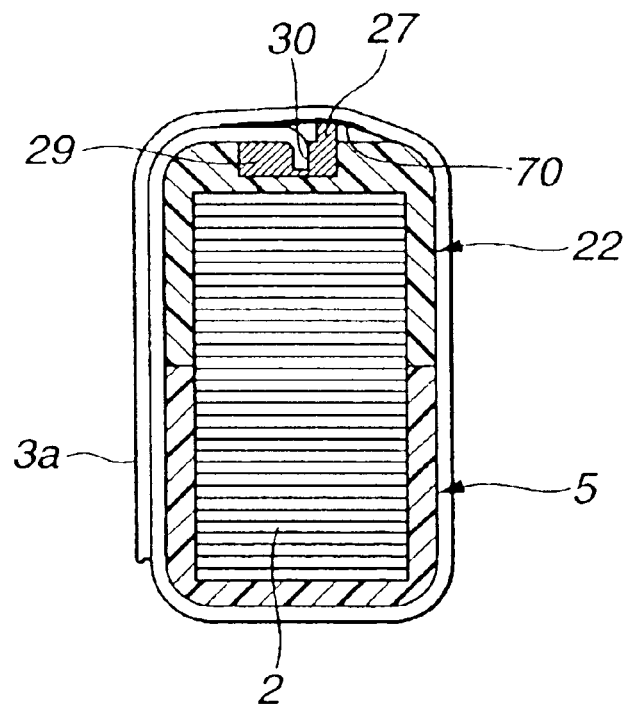

FIGS. 15A and 15B show an eighth embodiment with the same reference numerals as in the seventh embodiment of FIGS. 14A and 14B for identical parts. A connecting member 29 includes first and second upright projections 27 and 28 as in the seventh embodiment. However, a groove 30 formed in connecting member 29 is rectangular and perpendicular unlike the slant grooves 24 and 25 of the seventh embodiment. Moreover, groove 30 extends from the outer end to the inner end of connecting member 29 over the full length of connecting member 29. The rectangular cross sectional shape is uniform over the full length. The height of projections 27 and 28 is sufficiently greater than the thickness of flat wire 3a. Projection 27 is formed on the first side of groove 30 in the outer first side quarter of connecting member 22, and projection 28 is formed on the second side of groove 30 in the inner second side quarter. Thus, the single long groove 30 is shared by first and second windings 3A and 3B.

The insulating coating film is preliminarily removed from wire 3a at least in a region for contacting with connecting member 29. Then, the inner end of wire 3a is inserted into groove 30 of connecting member 29, and bent approximately at right angles so that the bared section is placed on the upper surface of connecting member 29. In this state, wire 3a is joined to connecting member 29 in the joint region 10 by ultrasonic welding. Then, wire 3a is wound around end caps 22 and 5 to form first winding 3A. According to the need, an insulating film 70 is interposed at the beginning of the second turn as in the example shown in FIG. 12B. Second winding 3B is wound in the same manner by first inserting the inner end of wire 3a into groove 30.

The eighth embodiment can provide the same effects as in the seventh embodiment. Moreover, connecting member 29 having the single continuous groove 30 of rectangular cross section is simple in construction, and easy to fabricate by machining.

FIGS. 16A, 16B and 16C show a ninth embodiment with the same reference numerals as in the first embodiment for identical parts. In this embodiment, a plate connecting member 32 shaped like a crank in a plan view is formed integrally in an end cap 31. Connecting member 32 is shaped into the crank shape having a first arm extending in a first direction from a first portion of a middle portion and a second arm extending in a second direction opposite to the first direction from a second portion of the middle portion, by die cutting or punching from a metal sheet such as copper sheet. Then, the crank-shaped connecting member 32 is bent into a curved form fitting to an inverted U-shaped outside wall surface of end cap 31. Accordingly, each of first and second arms is so curved as to match up to a curvature of a rounded edge between an end surface of a coil end portion and a side surface forming an inside wall surface of a slot. The thus-curved connecting member 32 is embedded in end cap 31 in the process of forming end cap 31, so that the bared surface of connecting member 32 forms a smooth continuous surface with the surrounding outside wall surface of end cap 31.

The thus-prepared end cap 31 is attached to one core segment 2 together with end cap 5, as shown in FIG. 16A. Then, as shown in FIG. 16B, the starting end of flat wire 3a is set to a bent portion 32a of the first arm of connecting member 32 and wire 3a is extended in parallel to the slot inside wall surface formed by end caps 31 and 5. In this state, the starting end of wire 3a is joined to the bent portion 32a of connecting member 32, by ultrasonic welding in a joint portion 10. In this embodiment, joint portion 10 is formed in parallel to the slot inside surface defining a slot between two adjacent core segments. Thereafter, wire 3a is wound up to a predetermined number of turns with wire tension. At the beginning of the second turn, insulating paper or insulating film is interposed between the inner starting end of wire 3a and a wire segment of the second turn to secure the insulation of the joint region 10 at which the covering film is damaged by the cut edge of starting end of wire 3a and ultrasonic welding. Second winding 3B is wound in the same manner.

In the ninth embodiment, at the beginning of winding operation of wire 3a for first and second windings 3A and 3B, the wire tension acts in the direction parallel to the slot inside wall surface. Therefore, it is possible to wind wire 3a without causing shear force in a thin wall portion in the slot inside wall of end cap 31, and hence without causing damage to end cap 31. Moreover, it is possible to reduce the wall thickness of each side of end cap 31 facing a slot, and thereby to increase the space factor of winding in a slot to the advantage of improvement in output performance.

Figure 17:
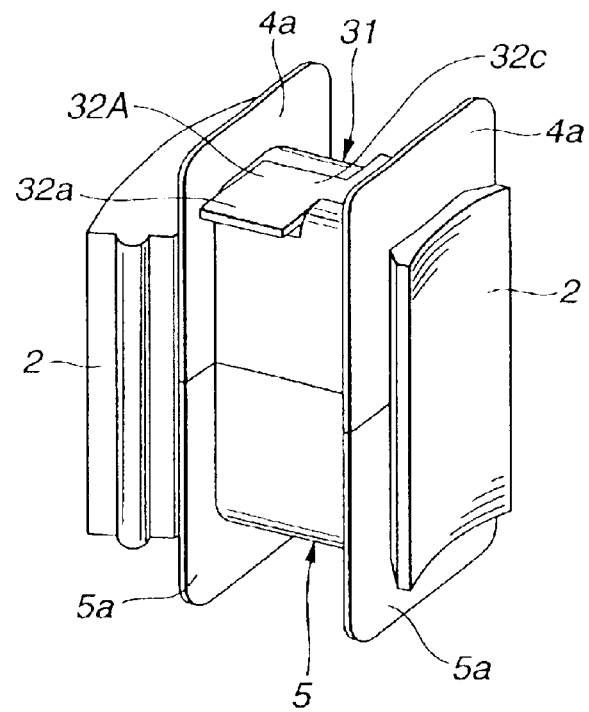
FIG. 17 is a perspective view showing a core segment according to a tenth embodiment in a state before wire is wound.
Figure 18:
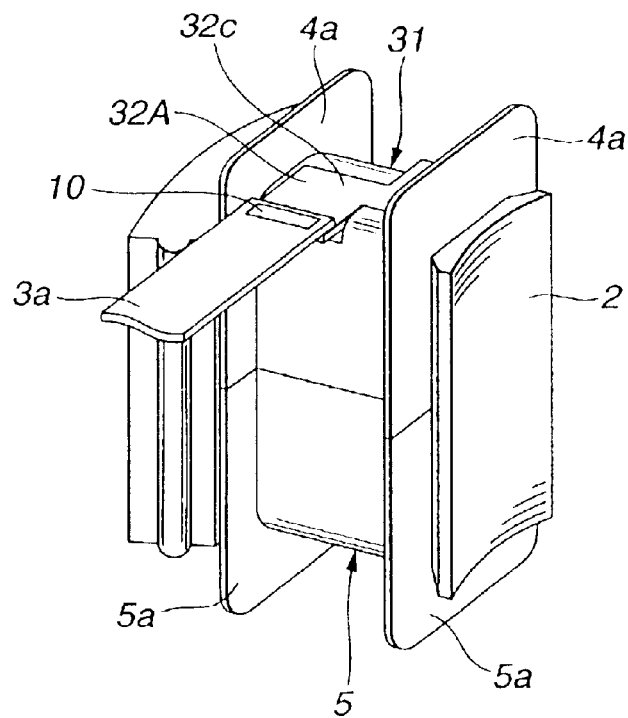
FIG. 18 is a perspective view showing the core segment of FIG. 17 in a state in which wire is joined to a connecting member.
Figure 19:
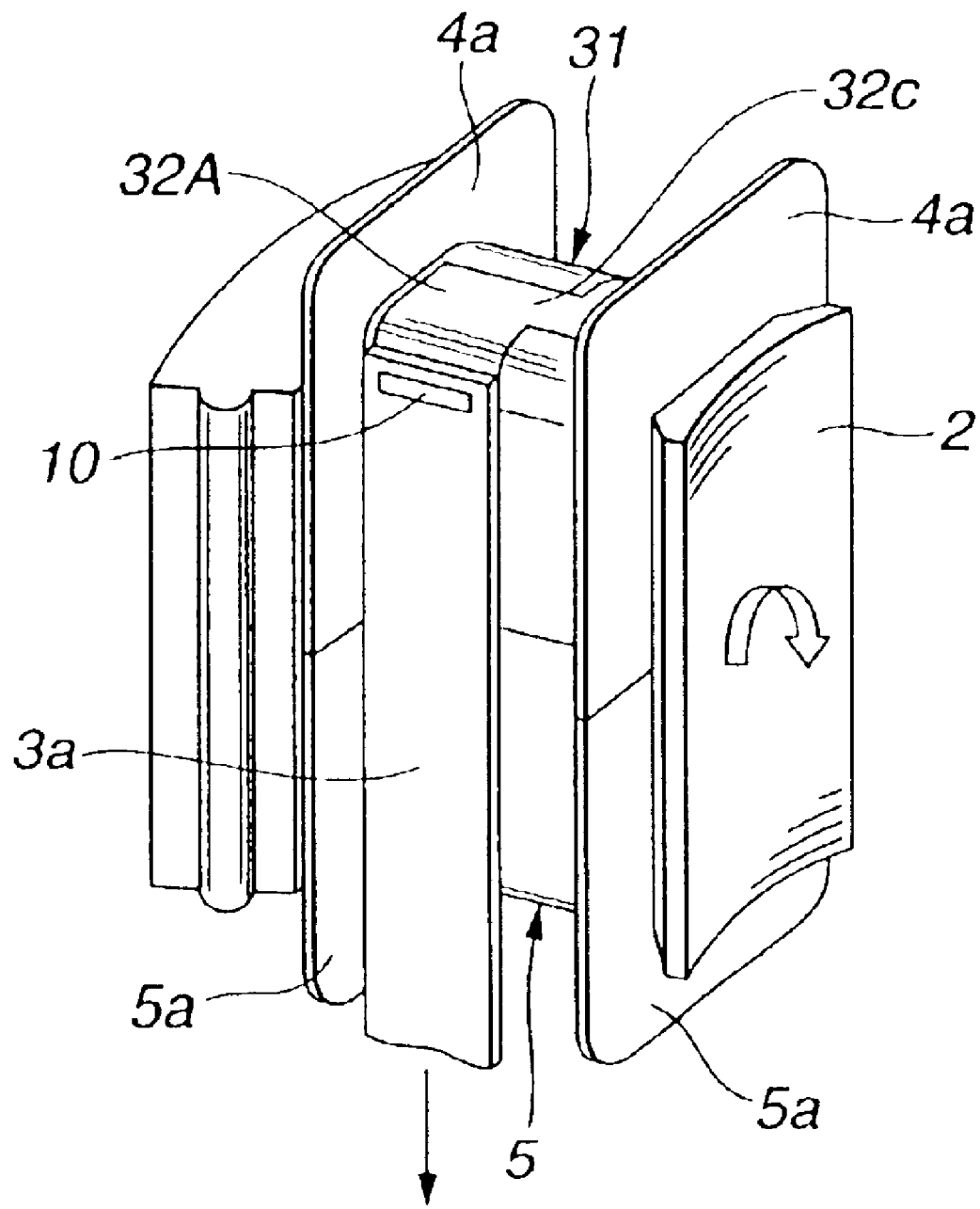
FIG. 19 is a perspective view showing the core segment of FIG. 17 in a state in which the connecting member is bent.

FIGS. 17, 18 and 19 show a tenth embodiment. A connecting member 32A according to this embodiment is shaped in the crank shape like connecting member 32 according to the ninth embodiment, but formed integrally in end cap 31 before a bending operation of bending the first and second arms of connecting member 32A, as shown in FIG. 17. In the state shown in FIG. 17 in which the flat connecting member 32A is fixed to end cap 31 in the forming operation of end cap 31 so that flat connecting member 32A is an integral portion of end cap 31, the flat first and second arms 32a of connecting member 32A project outwards from end cap 31 in the opposite directions. In this state, the starting end of flat wire 3a is overlapped on the first arm 32a of connecting member 32A, and joined to the first arm 32a in a joint region 10 by ultrasonic welding. In the tenth embodiment, however, it is possible to form a lap joint by directly clamping in the wall thickness direction from upper and lower sides as viewed in FIG. 18, and hence it is possible to employ, instead of ultrasonic welding, resistance clinching, or other joining process of greater thermal load.

After such a joining operation, flat wire 3a is wound around end cap 31, and the arm 32a of connecting member 32A is bent, by the tension of wire 3a, so as to fit over the rounded edge of end cap 31 until the wire is stretched contiguously on the slot inside wall surface. A sheet of insulating paper or insulating film is interposed between the inner starting end of wire 3a and the wire segment of the second turn as in the eighth embodiment shown in FIGS. 15A and 15B. When the cross sectional size of wire 3a is so large to bend the arm 32a of connecting member 32 with the wire tension alone, a bending operation using a tool such as a roller is effective. Second winding 3B can be formed in the same manner.

In the tenth embodiment, the productivity is improved without the need for a preliminary bending operation. Moreover, the projecting arms 32a make it possible to employ various joining methods from both sides of connecting member 32A. The joint structure allowing a direct clamping operation of clamping the starting end of wire 3a and the projecting arm 32a of connecting member 32A is effective in improve the reliability of the joint structure.

Figure 20A:
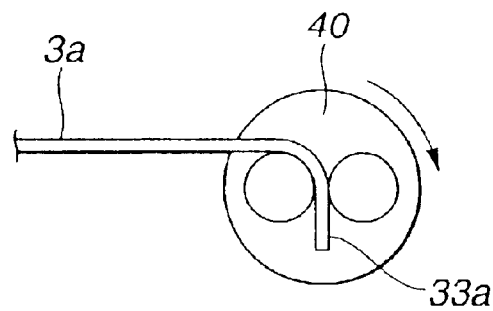
FIGS. 20A, 20B and 20C are views showing a production process of a stator segment according to an eleventh embodiment.
Figure 20B:
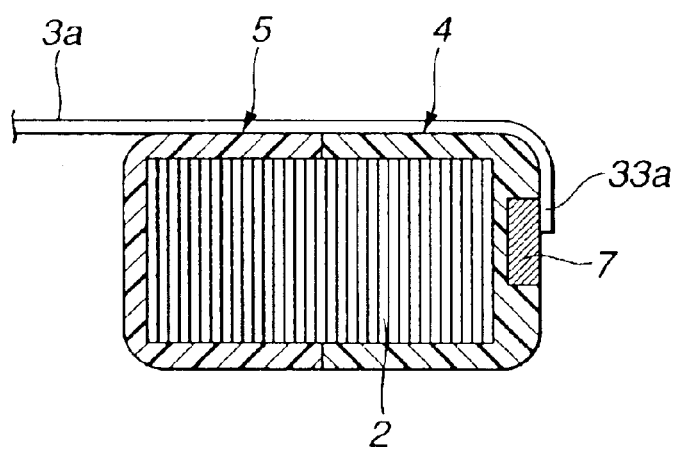
Figure 20C:
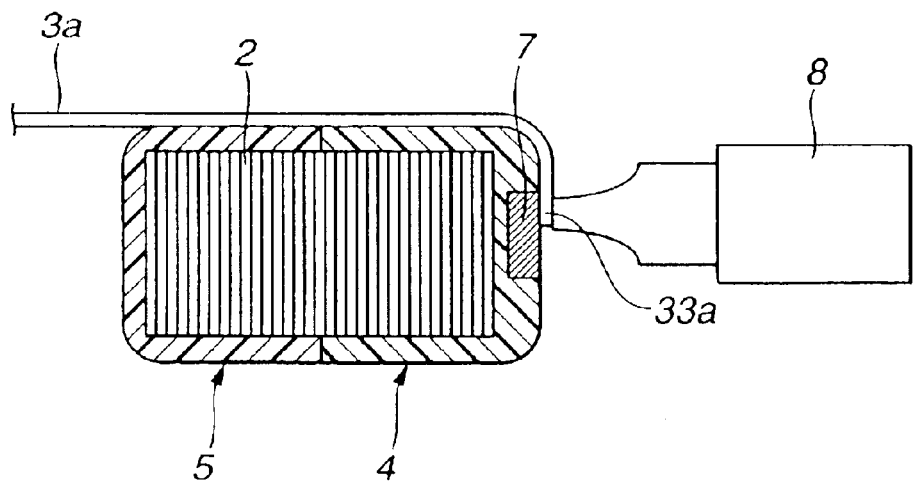

FIGS. 20A, 20B and 20C show an eleventh embodiment with the same reference numerals as in the first embodiment as shown in FIG. 6, for identical parts. An insulating film is removed preliminarily from the starting end of wire 3a, and the starting end of wire 3a is bent, as shown in FIG. 20A to form a rounded corner of about 90° with a bent end segment 33a by using a bending roller 40. Then, bent end segment 33a is set to a connecting member 7 formed in end cap 4, and the bent portion is set to a rounded edge of end cap 4 as shown in FIG. 20B. Wire segment adjacent to the bent portion is set contiguously in contact with a slot inside wall surface of end caps 4 and 5. In this state, a horn 8 is pressed on an overlapped portion between the starting end 33a of wire 3a and connecting member 7 and a lap joint structure is formed by ultrasonic welding therebetween. Thereafter, wire 3a is wound around end caps 4 and 5 with wire tension. In this winding operation, a main component of a force acting on end caps 4 and 5 is in the laminate direction of magnetic steel sheets of core segment 2, or the axial direction of the annular stator, and therefore, this structure can reduce the shear force applied on the thin wall sections of end caps 4 and 5 on the slot inner side and thereby prevent breakage of end caps 4 and 5. Second winding 3B is wound in the same manner with the same advantage.

Wire 3a is wound after bending and joining operation, so that the structure of the eleventh embodiment can reduce the force trying to remove connecting member 7. Moreover, the eleventh embodiment can reduce the possibility of breakage of end caps 4 and 5 by reducing the shear force acting on thin wall sections of end caps 4 and 5. The eleventh embodiment makes it possible to reduce the wall thickness of both sides of each end cap, and thereby increase the space factor of windings.

Figure 21:
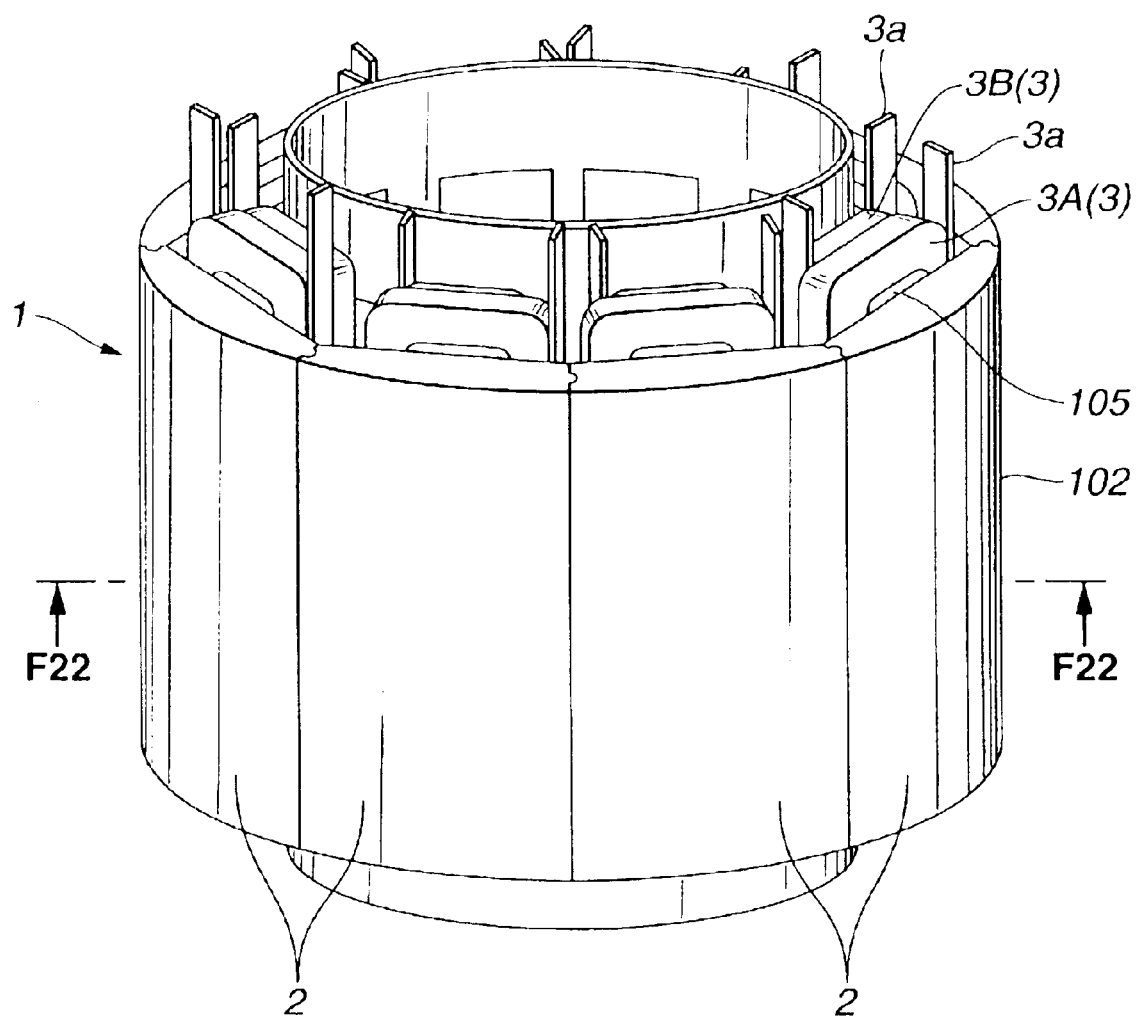
FIG. 21 is a perspective view showing a stator according to a twelfth embodiment of the present invention in the assembled state.
Figure 22:
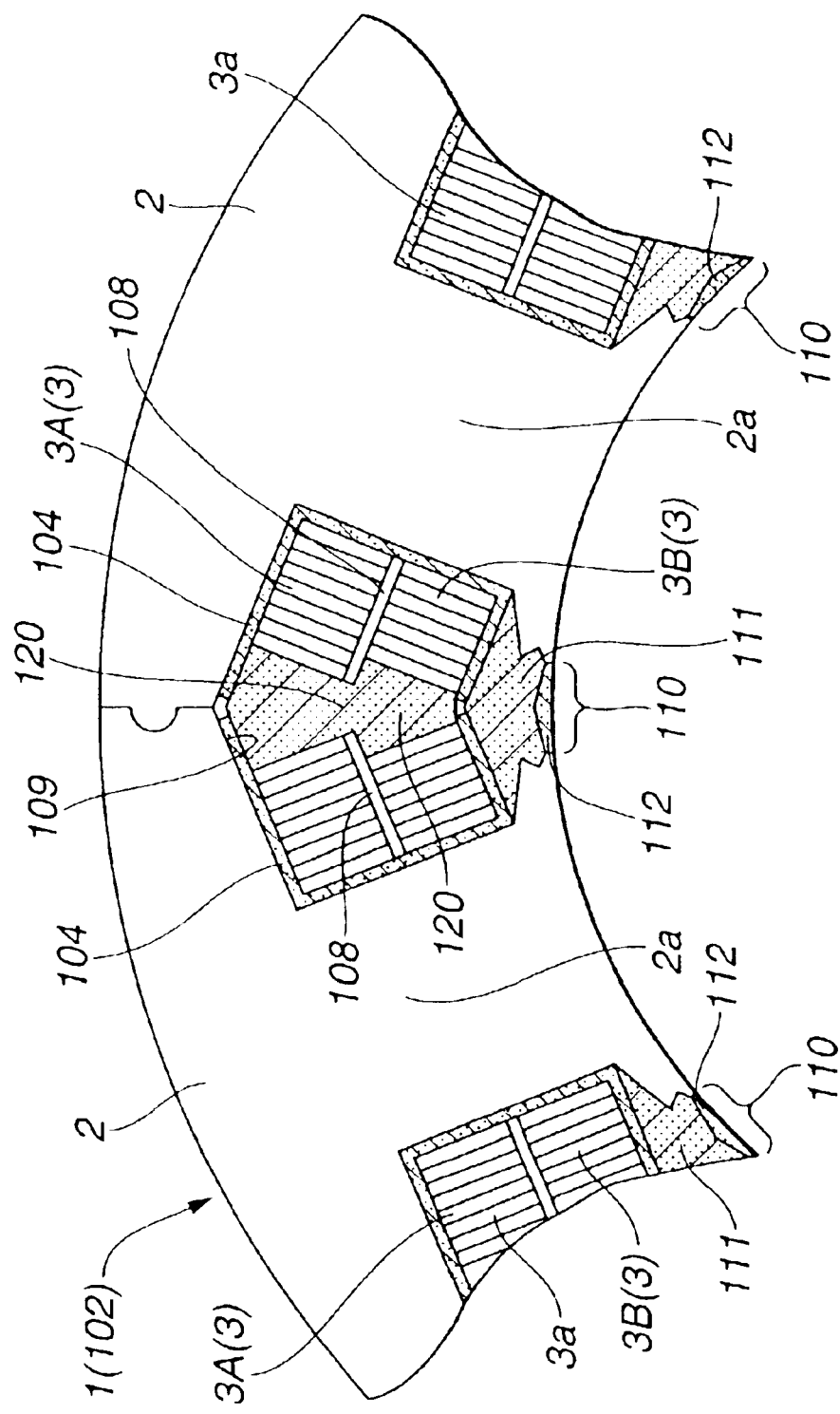
FIG. 22 is a sectional view of the stator shown in FIG. 21.

FIGS. 21~27 show a twelfth embodiment. FIG. 21 shows an annular stator 1 according to the twelfth embodiment, and FIG. 22 shows a part of a section taken across a line F22—F22. Stator 1 includes, as a main component, a stator core 102 of a segmented type made up of a plurality of core segments 2 as in the preceding embodiments. Each core segment 2 is a laminate of magnetic steel plates formed by die cutting of magnetic steel sheet. Each core segment 2 includes an outer circumferential portion and a salient pole portion 2a projecting inwards from the outer circumferential portion. An insulating layer 104 is formed around salient pole portion 2a by insulating paper, and end caps 105 are attached, respectively, both ends of core segment 2 spaced in the laminate direction of magnetic steel plates (or the axial direction of annular stator 1). Wire 3a is wound on end caps 105 and insulating layers 104 around salient pole portion 103a, to form a winding 3 made up of first and second windings 3A and 3B.

In this embodiment, wire 3a is wound on core segment 2 with the interposition of the insulating layer of insulating paper 104. In the example of FIG. 21, as in the preceding embodiments, flat wire (or rectangular wire) 3a is wound flatwise without being traversed, each of second or subsequent tunes being just over the preceding turn, to form each of first and second windings 3A and 3B. First and second windings 3A and 3B are arranged in the radial (or diametral) direction of annular stator 1. Between first and second windings 3A and 3B, there is formed a clearance serving as a coolant passage 108 for conveying a cooling medium.

Between any two adjacent core segments 2, there is formed a slot 109 having a radial inner opening 110 in which an insulating wedge 111 is inserted as means for closing. Insulating wedge 111 is so shaped as to fill a space from opening 110 to insulating paper layer 104. The length of insulating wedge 111 as measured in the axial direction of stator 1 is substantially equal to the thickness of the magnetic steel plate laminate of core segment 2. A cylindrical wall 112 for bounding a space for cooling oil is formed by molding of resin with a mold in which core segments 2 with wedges 111 are placed. The inside diameter of cylindrical wall 112 is substantially equal to the inside diameter of annular stator core 102. In this resin molding process, resin is supplied from one end in the laminate direction of the laminate of magnetic steel plates and a cylindrical wall section is formed at one coil end. Resin flows through a clearance (to become part of cylindrical wall 112) formed between the inside surface of stator and wedge 111 in opening 110 of each slot 109, to the other coil end, and forms a cylindrical wall section at the other coil end.

Figure 23:
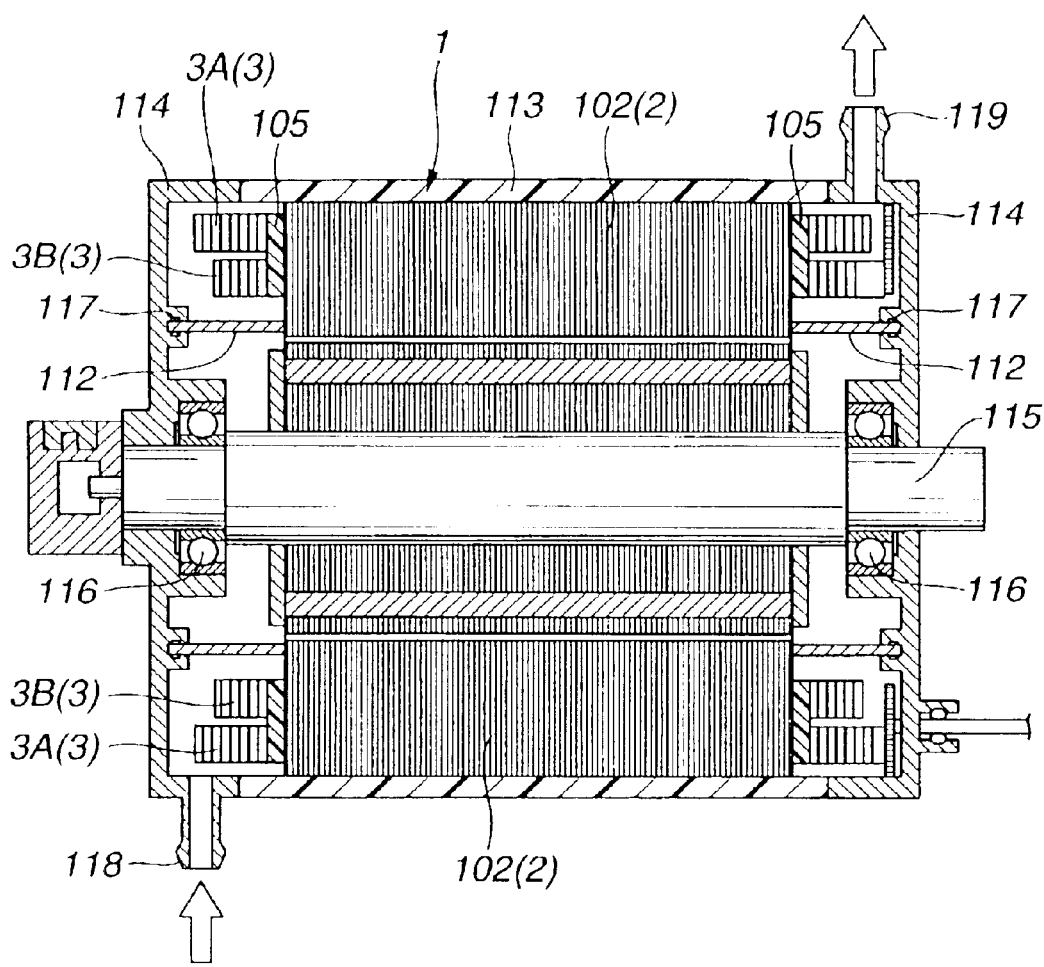
FIG. 23 is a sectional view of a motor including the stator of FIG. 21.

FIG. 23 shows in section the thus-constructed stator 1 assembled in motor. Stator 1 is press-fit in a case 113 whose axial ends are closed by end brackets 114. A rotor 115 is rotatably supported at both ends by bearings 116 supported by end brackets 114. Each end bracket 114 is formed with an annular inward projection having an annular groove fittingly receiving one axial end of cylindrical wall 112 through an oil seal 117 disposed in the annular groove for sealing between cylindrical wall and end bracket 114. Thus, cylindrical wall 112 forms a sealed space in which stator winding 3 is disposed. This structure enables direct cooling of windings by circulating the cooling medium such as a cooling oil through the sealed space. One of end brackets 114 is formed with a cooling oil inlet 118, and the other end bracket 114 is formed with a cooling oil outlet 119. Cooling oil flow into the sealed space from inlet 118 at one axial end of the motor to cool the coil end portion at one axial end, then flows axially in space in each slot 109 in the axial direction of the motor, and reaches the coil end portion at the other axial end. Then, the cooling oil is discharged through outlet 119.

Figure 24:
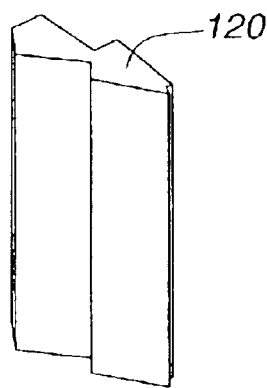
FIG. 24 is a perspective view showing one of spacers used in the stator of FIG. 22.

FIG. 24 shows a spacer 120 to be inserted in each slot 109 between adjacent windings 3. Spacers 120 are made of resin having high heat resistance such as PPS resin. The space between the adjacent windings 3 of two adjacent poles is sealed by spacer 120. Therefore, there remain only cooling medium passages 8 between two windings 3A and 3B for the cooling medium to flow in the axial direction of stator 1 from one axial end to the other axial end.

Figure 25A:
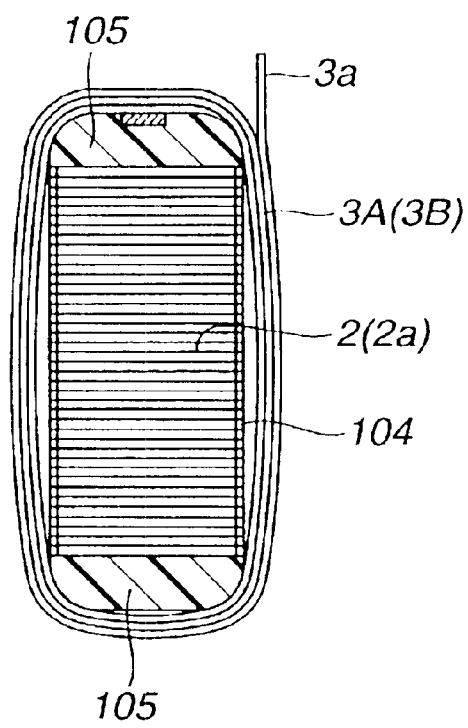
FIGS. 25A and 25B are sectional views illustrating forces applied by the spacer to winding.
Figure 25B:
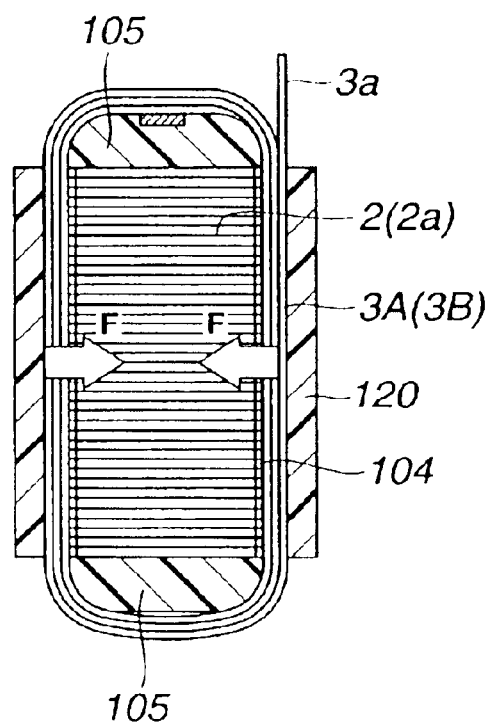

FIG. 25A shows a rectangular cross section of salient pole portion 2a of one core segment 2. By the effect of spring back of bent wire (copper wire) 3a, the winding tends to slightly bulge outward leaving a clearance without closely overlapping the side surfaces formed by insulating paper 104 and end caps 105. FIG. 25B shows the assembled state after spacers 120 are inserted. The size of each spacer 120 is slightly greater than the size of the slot space in the assembled state of stator 1. Accordingly, each spacer 120 applies a force F as shown in FIG. 25B and presses the bulge of the winding to the salient pole portion 2a of core segment 2 to reduce the undesired clearance formed by spring back of wound wire 3a.

The cooling oil flows axially through cooling oil passages 8 formed between two adjacent windings 3A and 3B from the inlet side to the outlet side. Accordingly, the cooling structure according to this embodiment cools the all the windings by the flow of the cooling oil directly, and thereby reduces the width of temperature distribution in windings by reducing the nonuniformity of the cooling effect. The interposition of spacers 120 functions to press the windings closer together, and facilitates the thermal conduction among wires 3a to the advantage of reduction of temperature nonuniformity.

The close packing of wire 3a by spacers 120 helps reduce the friction among wires 3a by mechanical vibrations and electromagnetic vibrations during motor operation, and thereby prevents dielectric breakdown. Moreover, the close packed structure with spacers 120 eliminates the need for varnish operation to fix windings, to the advantage of productivity and cost reduction.

Moreover, spacers 120 securing slots 109 are effective in improving the rigidity of the stator in the assembled state, and thereby reducing vibrations of salient pole portions 103a and noises during motor operation. The improvement of cooling effect helps lower the temperature of windings, and hence makes it possible to employ electric wire having insulating coating of lower grade to reduce the cost.

Figure 26:
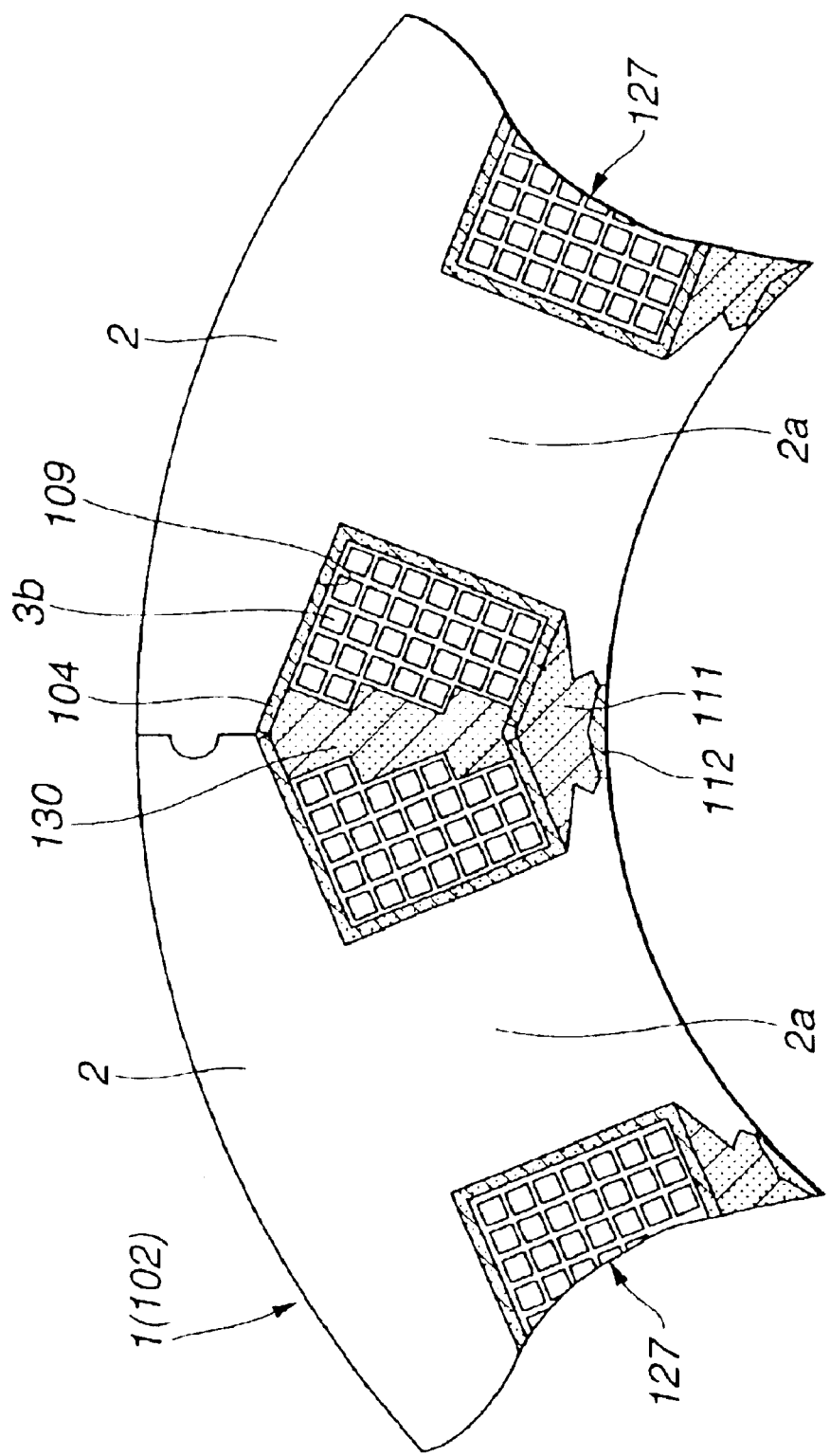
FIG. 26 is a sectional view showing a variation of the twelfth embodiment in which square wire is wound in traverse winding.

FIG. 26 shows another example according to the twelfth embodiment. In this example, square wire 3*b* is wound with traversing. Each slot 109 has therein a spacer 130 having an outside shape conforming to the outside configuration of winding 127 and pushing wires 3*b* to the salient pole portion 2*a* of core segment 2. Thus, spacer 130 closes the remaining space in slot 109 between adjacent windings 127, and thereby causes the cooling medium to flow through clearances among wires 3*b* to reduce the nonuniformity in the cooling effect.

Figure 27:
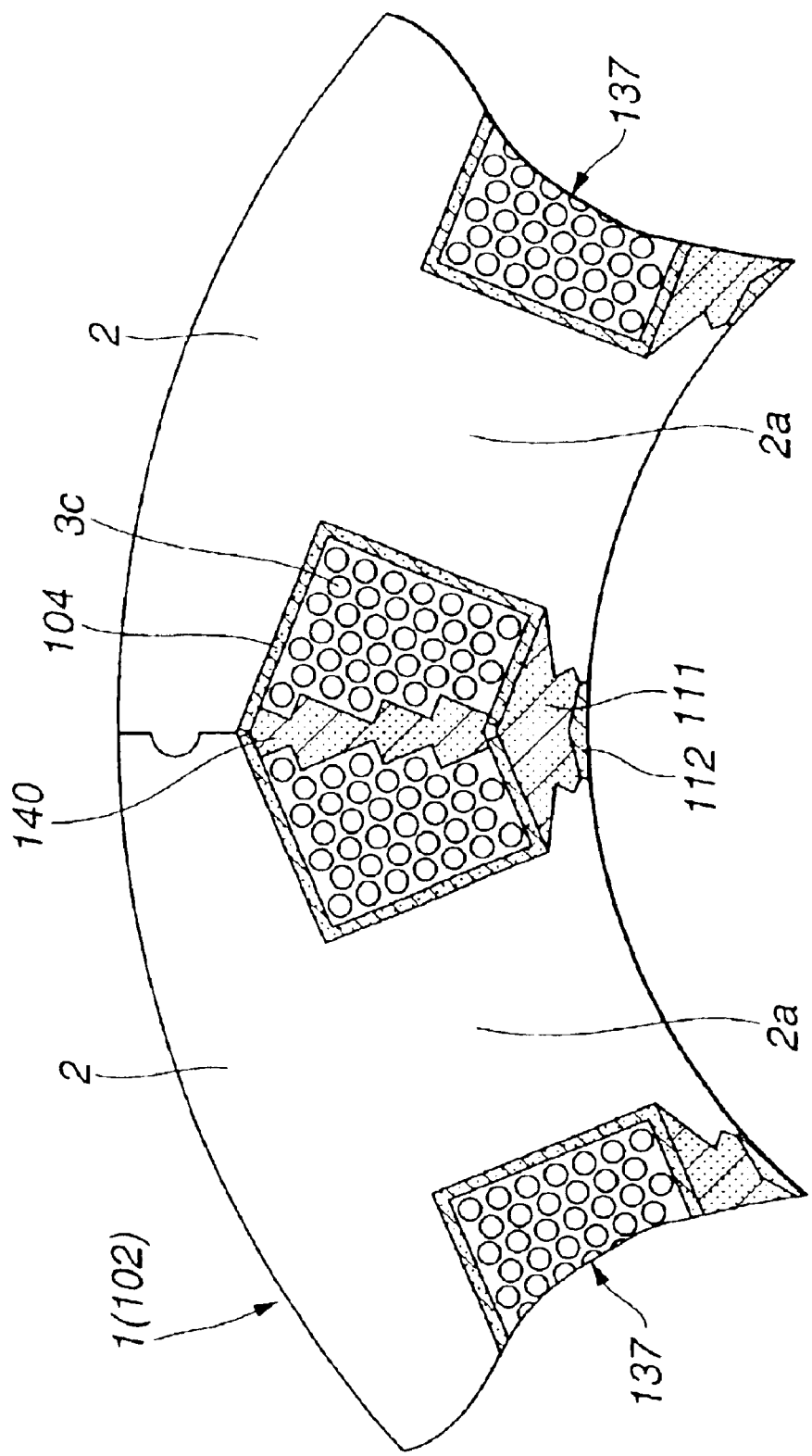
FIG. 27 is a sectional view showing another variation of the twelfth embodiment in which round wire is wound in traverse winding.

FIG. 27 shows still another example of the twelfth embodiment in which round wire 3*c* is wound. In this example, too, each slot 109 is plugged with a spacer 140 having an outside shape conforming to the outside configuration of winding 137 and pushing wires 3*c* to the salient pole portion 2*a* of core segment 2. Thus, spacer 140 closes the remaining space in slot 109 between adjacent windings 137, and thereby causes the cooling medium to flow through clearances among wires 3*c* to reduce the nonuniformity in the cooling effect.

Figure 28:
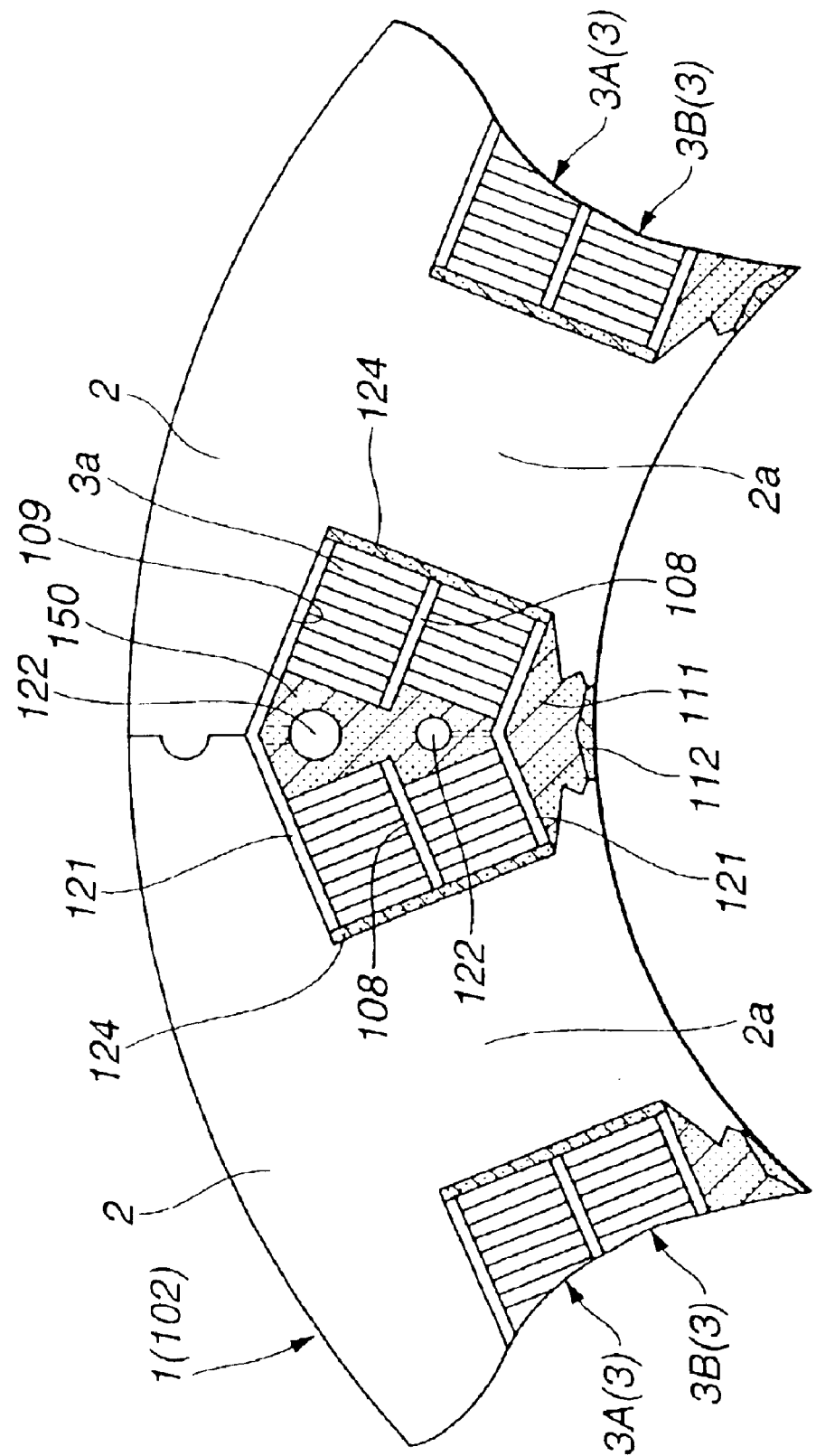
FIG. 28 is a sectional view showing a stator according to a thirteenth embodiment, including a spacer formed with runners.

FIG. 28 shows a thirteenth embodiment with the same reference numerals as in the twelfth embodiment for identical parts. After the forming step of forming cylindrical wall 112 of resin including the portion in the opening 110 of each slot 109 in core segments 2 assembled in the annular stator 102, each slot 109 is plugged with a spacer 150 formed with runners 122. In the example of FIG. 28, insulating layer 124 of insulating paper is formed only in the inner circumferential portion on which flat wire 3*a* is wound. On each of radial inner and outer sides of windings 3A and 3B, there is formed a clearance 121 in the form of hollow layer having a thickness approximately equal to the thickness of insulating paper layer 124. Cooling passage 108 formed between first and second windings 3A and 3B is located, in the radial (or diametral) direction of annular stator 1, between the outer clearance 121 formed on the radial outer side of the outer winding 3A and the inner clearance 121 formed on the radial inner side of the inner winding 3B.

Figure 29:
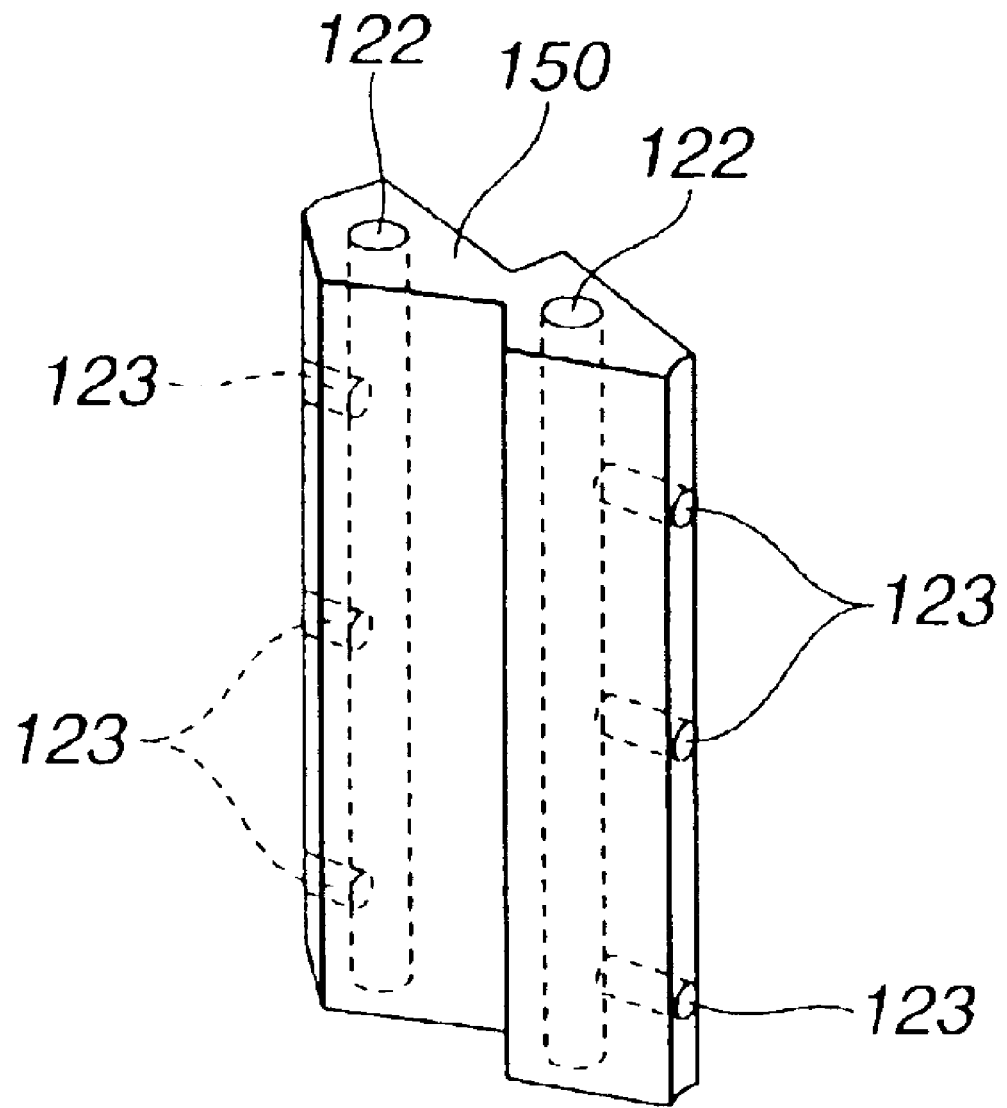
FIG. 29 is a perspective view showing the spacer of FIG. 28.

FIG. 29 shows one spacer 150. Spacer 150 is formed with two through holes 122 extending in the axial direction of the annular stator and serving as a runner. Spacer 150 is further formed with branch holes 123 extending in the radial direction of the annular stator 1, from the outer or inner runner 122 and opening to the outer or inner clearance 121. Resin of high thermal conductivity is filled in clearances 121 through these branch holes 123 and runners 122.

Figure 30:
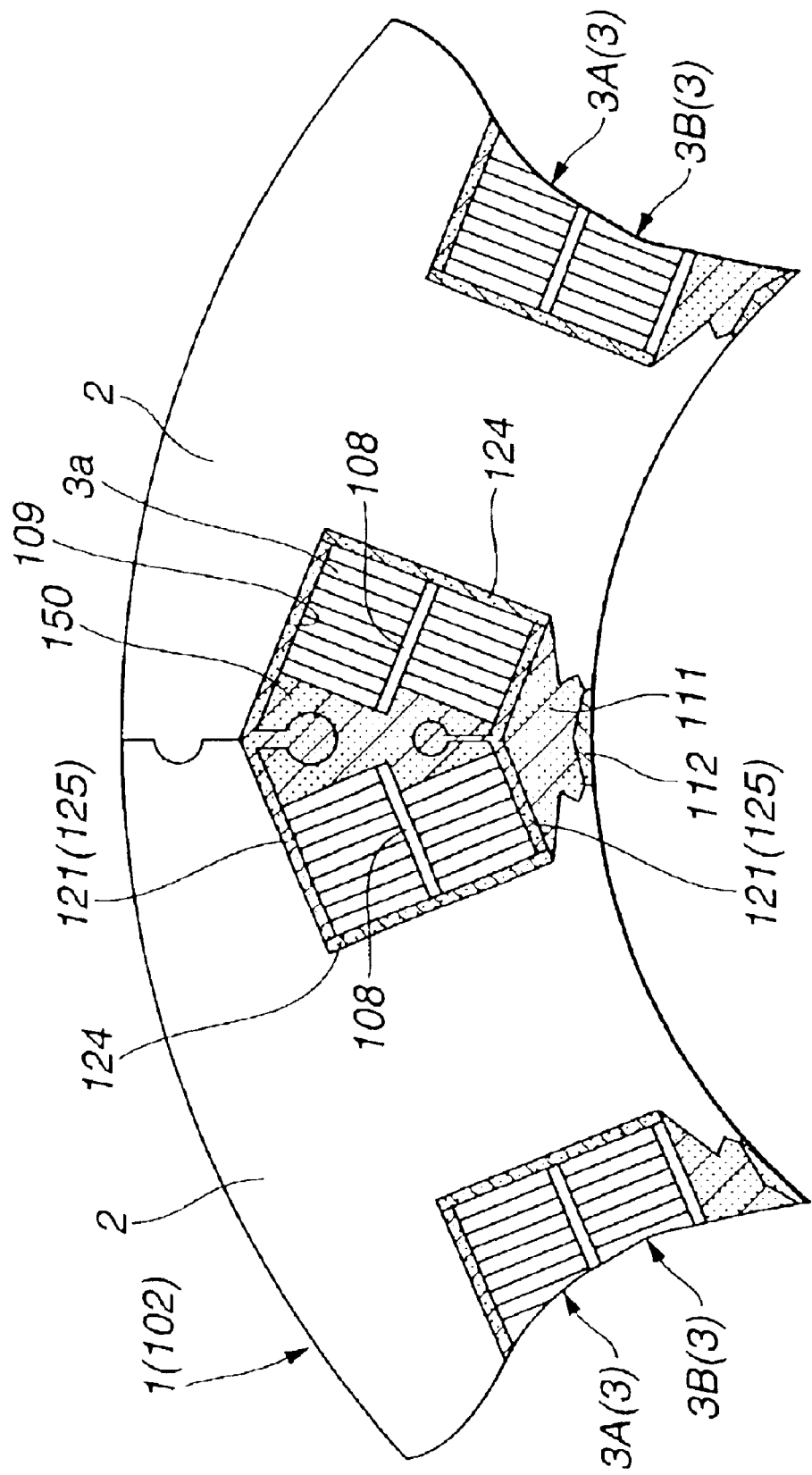
FIG. 30 is a sectional view showing the stator of FIG. 28 in a state after an operation of filling resin.

FIG. 30 shows part of stator 1 after the operation of filling resin in clearances 121 through runners 122. Resin 125 filled in clearances 121 through runners 122 promotes heat conduction between core segments 2 and windings 3. When ordinary insulating paper is used, it is difficult to form winding in tight contact with core segment 2 in the radial direction, and there is formed, between winding 3 and insulating paper 124, or between insulating paper 124 and core segment 2, a layer of air detrimental to heat conduction. Therefore, in this embodiment, the layer of resin 125 facilitates the thermal conduction from the winding to core segment 2, and improves the cooling efficiency. This structure secures oil passages 108 for effective oil cooling, and provides effective heat transfer modes for various portions without producing a region causing oil to stagnate.

Spacer 150 receives a force in a radial inward direction of the stator by the charging pressure of resin 125, and thereby acts to firmly press the windings of poles on both sides, so that the windings become able to transfer heat more efficiently. Moreover, the charging pressure acts to produce an effect of sealing the resin 125 filled in the interspace between the backtooth portion and windings, so that the inside of the slot is adequately divided into the region to promote the heat transfer with the filled resin, and the region of heat exchange by the flow of cooling medium.

Figure 31:
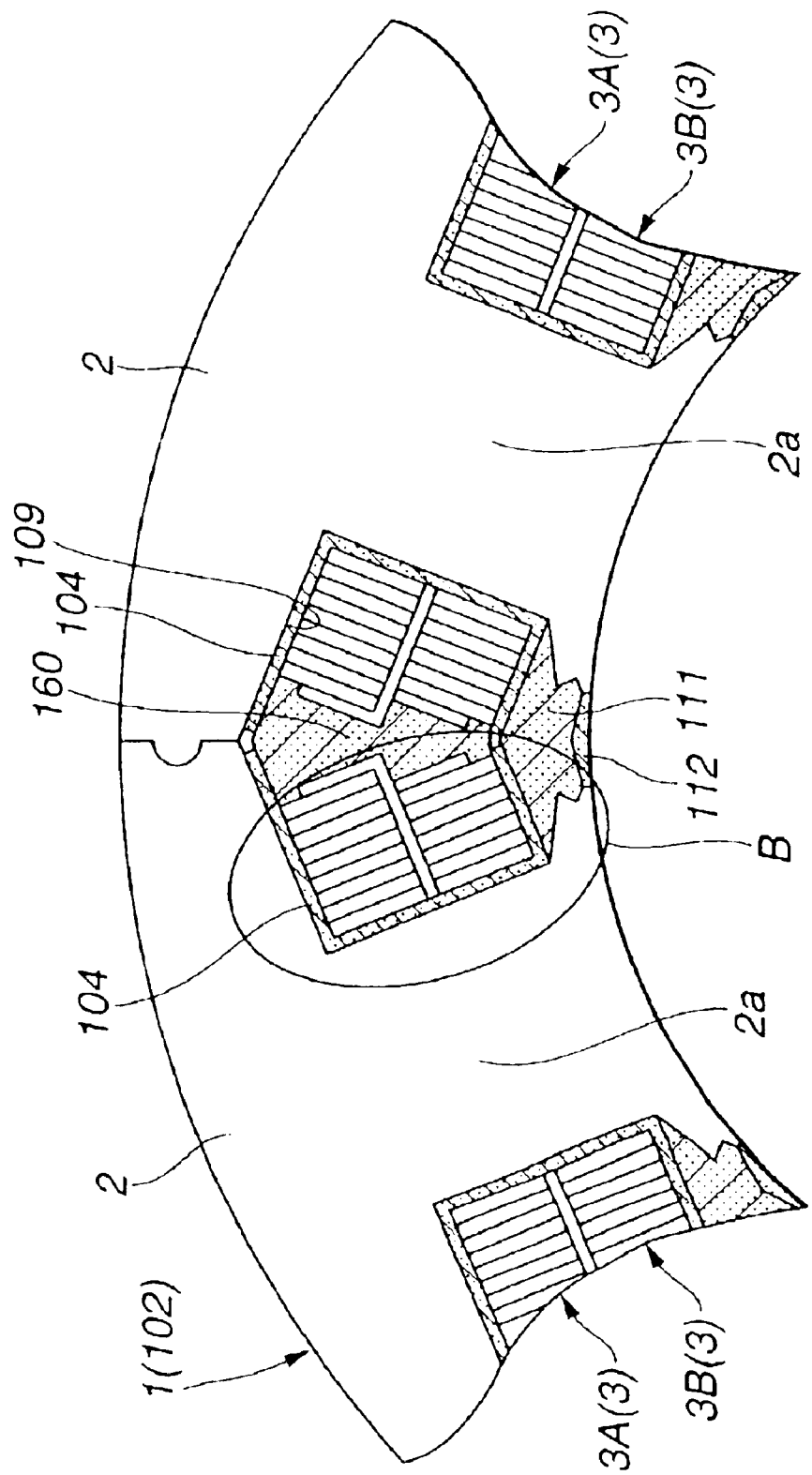
FIG. 31 is a sectional view showing a stator according to a fourteenth embodiment.

FIG. 31 shows a fourteenth embodiment. Unlike spacer 150 having runners 122, a spacer 160 shown in FIG. 31 has no runners. Instead, spacer 160 of FIG. 31 is arranged to contact with adjacent windings only in limited areas.

Figure 32:
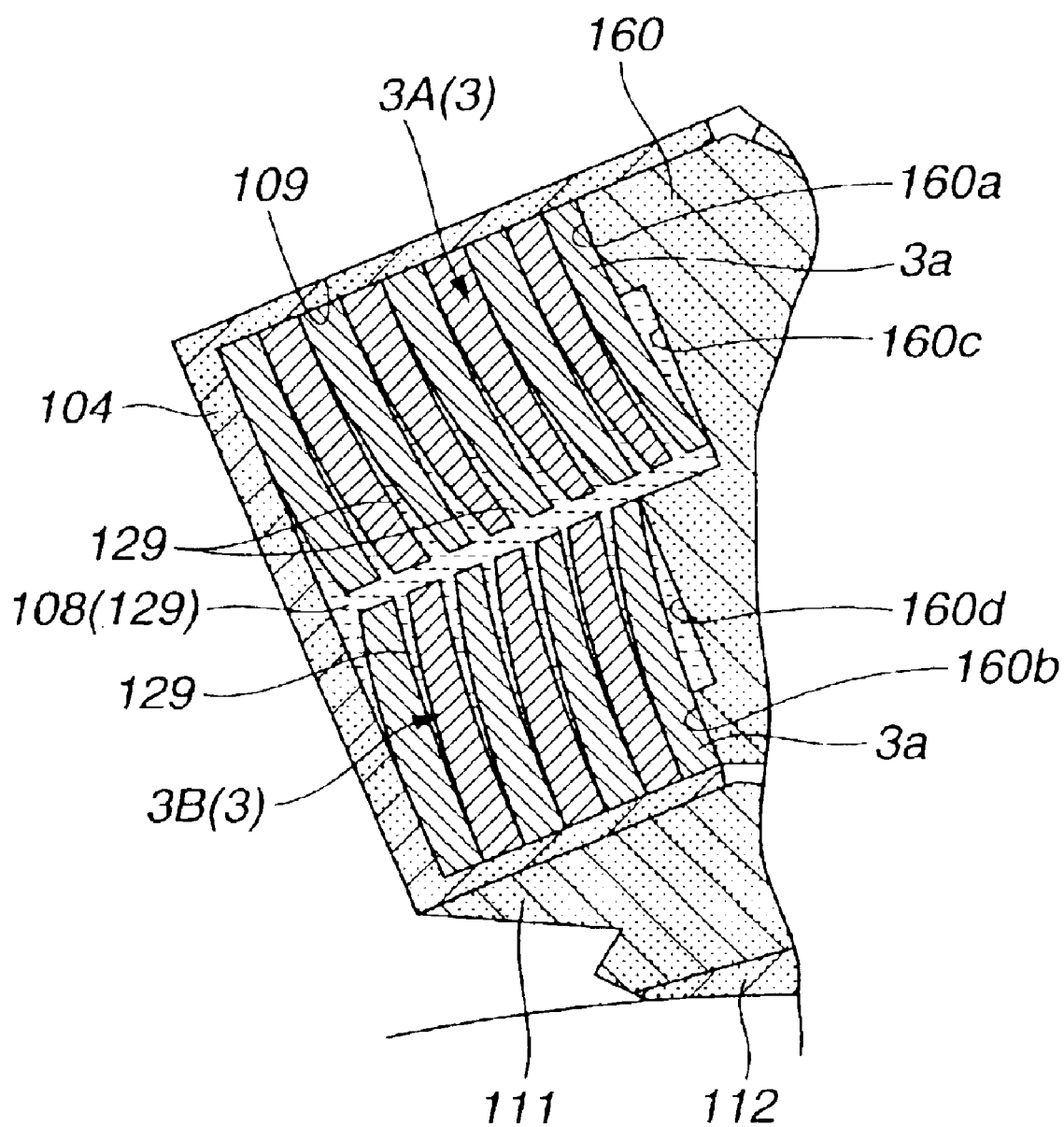
FIG. 32 is an enlarged sectional view of a portion B shown in FIG. 31.

Each of spacers 120, 130, 140 and 150 is so shaped as to contact with the entirety of the outer circumferential surface of outer winding 3A on the radial outer side of stator 1, and with the entirety of the outer circumferential surface of inner windings 3B on the radial inner side of stator 1. Unlike these spacers, as shown in FIG. 32, spacer 160 includes an outer abutting surface 160*a* abutting on an outer part of the outer circumferential surface of outer winding 3A and an inner abutting surface 160*b* abutting on an inner part of the outer circumferential surface of inner winding 3B. Spacer 160 further includes an outer depressed surface 160*c* depressed from outer abutting surface 160*a* so as to produce a step therebetween and arranged to confront an inner part of the outer circumferential surface of outer winding 3A across a clearance formed therebetween, and an inner depressed surface 160*d* depressed from inner abutting surface 160*b* so as to produce a step therebetween and arranged to confront an outer part of the outer circumferential surface of inner winding 3B across a clearance formed therebetween. In the radial direction of the stator 1, outer and inner depressed surfaces 160*c* and 160*d* are located between outer and inner abutting surfaces 160*a* and 160*b*.

As shown in FIG. 32 showing a portion B of FIG. 31 in an enlarged scale, there can be formed clearances among turns of windings around cooling passage 108, so that the cooling oil 129 can penetrate into the clearances among turns of windings, and cool the windings efficiently with larger contact areas between cooling oil and windings. Outer and inner depressed surfaces 160*c* and 160*d* allow windings 3A and 3B to partly spread by the spring back, and form the above-mentioned clearances for cooling oil 129. By the decrease in the contact area between spacer 160 and windings 3A and 3B, this embodiment can decrease an inserting force for inserting spacer 160, and thereby prevent breakage of spacer 160.

Figure 33:
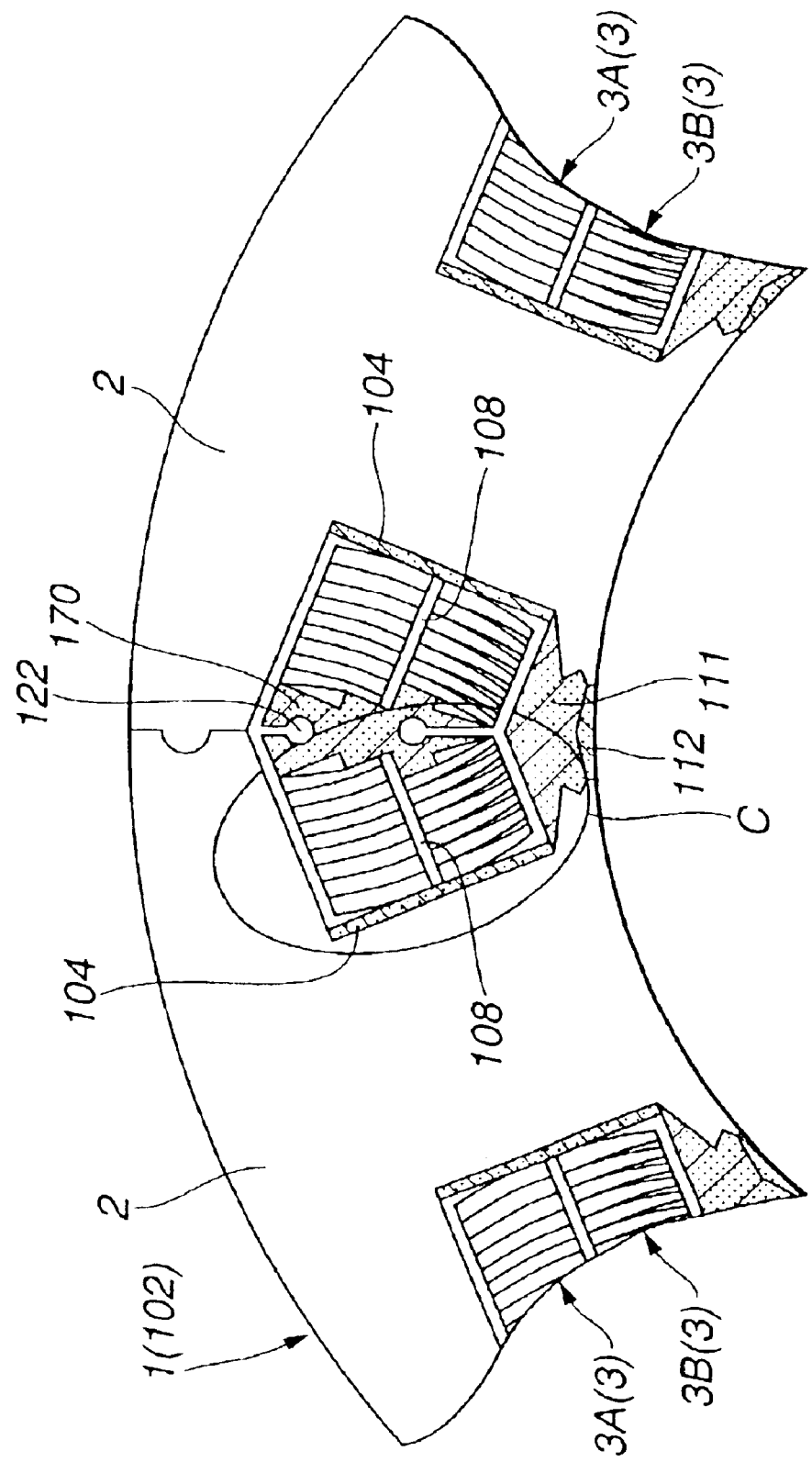
FIG. 33 is a sectional view showing a stator according to a fifteenth embodiment.

FIG. 33 show a fifteenth embodiment. A spacer 170 of FIG. 33 is formed with runners 122 as in the thirteenth embodiment shown in FIG. 28, and shaped so as to limit the contact area with windings 3A and 3B as in the fourteenth embodiment shown in FIG. 31.

Figure 34:
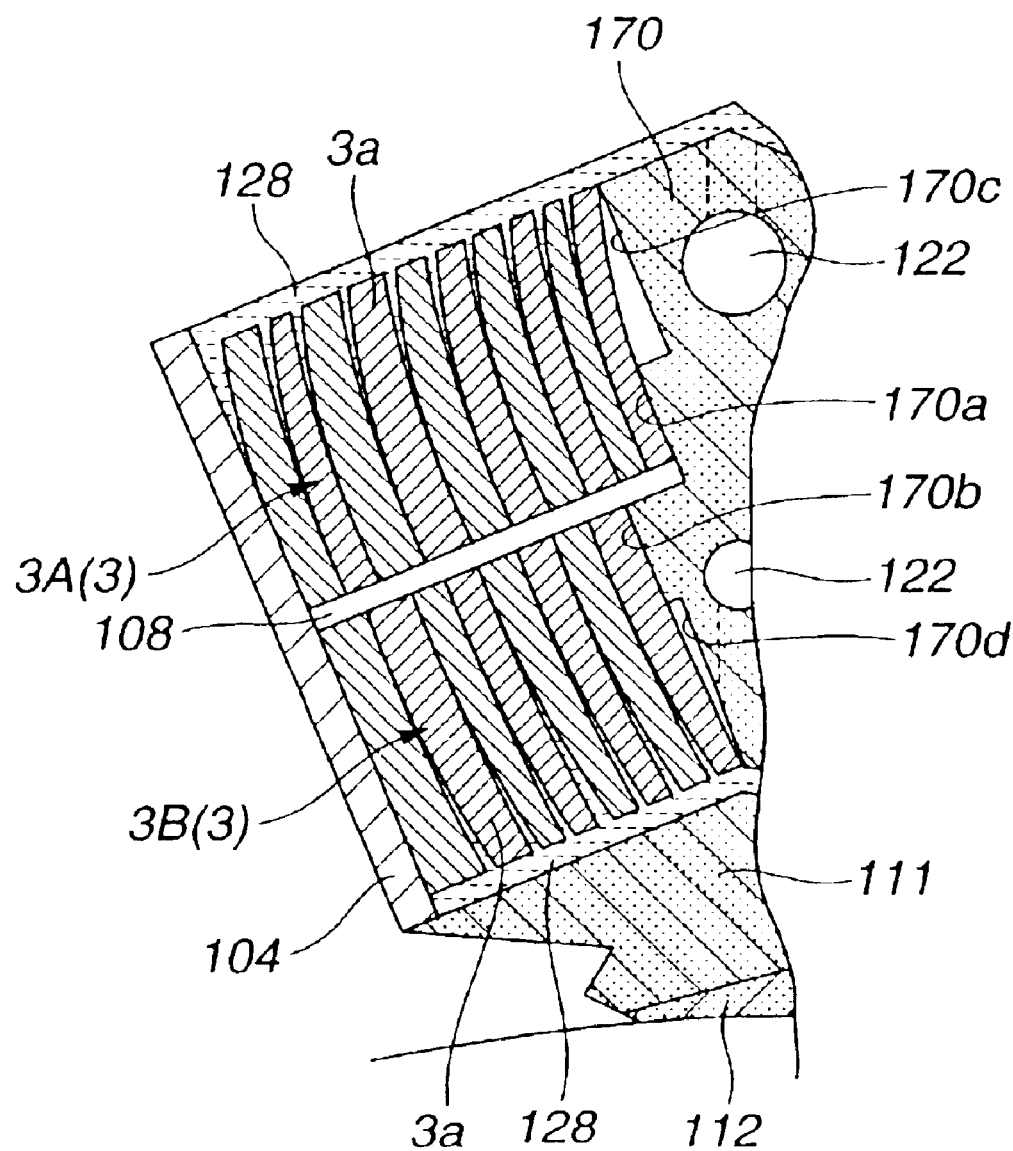
FIG. 34 is an enlarged sectional view showing a portion C of FIG. 33.

As shown in FIG. 34 which is an enlarged view showing a portion C of FIG. 33, spacer 170 includes an outer abutting surface 170*a* abutting on an inner part of the outer circumferential surface of outer winding 3A and an inner abutting surface 170*b* abutting on an outer part of the outer circumferential surface of inner winding 3B. Spacer 170 further includes an outer depressed surface 170*c* depressed from inner abutting surface 170*a* so as to produce a step therebetween and arranged to confront an outer part of the outer circumferential surface of outer winding 3A across a clearance formed therebetween, and an inner depressed surface 170*d* depressed from inner abutting surface 170*b* so as to produce a step therebetween and arranged to confront an inner part of the outer circumferential surface of inner winding 3B across a clearance formed therebetween. In the radial direction of stator 1, outer and inner abutting surfaces 160a and 160b are located between outer and inner depressed surfaces 170c and 170d. Each depressed surface 170c or 170d is designed to apply no pressing force due to the insertion of spacer 170, onto an adjacent winding.

In the state in which windings 3A and 3B are partially pressed so as to seal clearances around cooling passage 108 by the insertion of spacer 170, thermally conductive resin is filled through runners 122 of spacer 170. By this filling operation, there are formed an outer resin layer 128 on the radial outer side of winding 3A and an inner resin layer 128 on the radial inner side of winging 3B, as shown in FIG. 34. On the radial outer side of outer winding 3A and the radial inner side of inner winding 3B, there are formed clearances among turns of wire 3a by the effect of spring back. During the operation of filling resin, resin can flow into these clearances and form resin layers 128 having larger contact area with windings 3A and 3B, to the advantage of improvement of thermal conductivity between core segment 2 and windings.

Spacer 170 is pushed in the radial inward direction of stator by the charging pressure of resin. Therefore, the abutting surfaces 170a and 170b of spacer 170 press windings firmly and thereby prevent the resin from flowing toward and into cooling passage 108.

Figure 35:
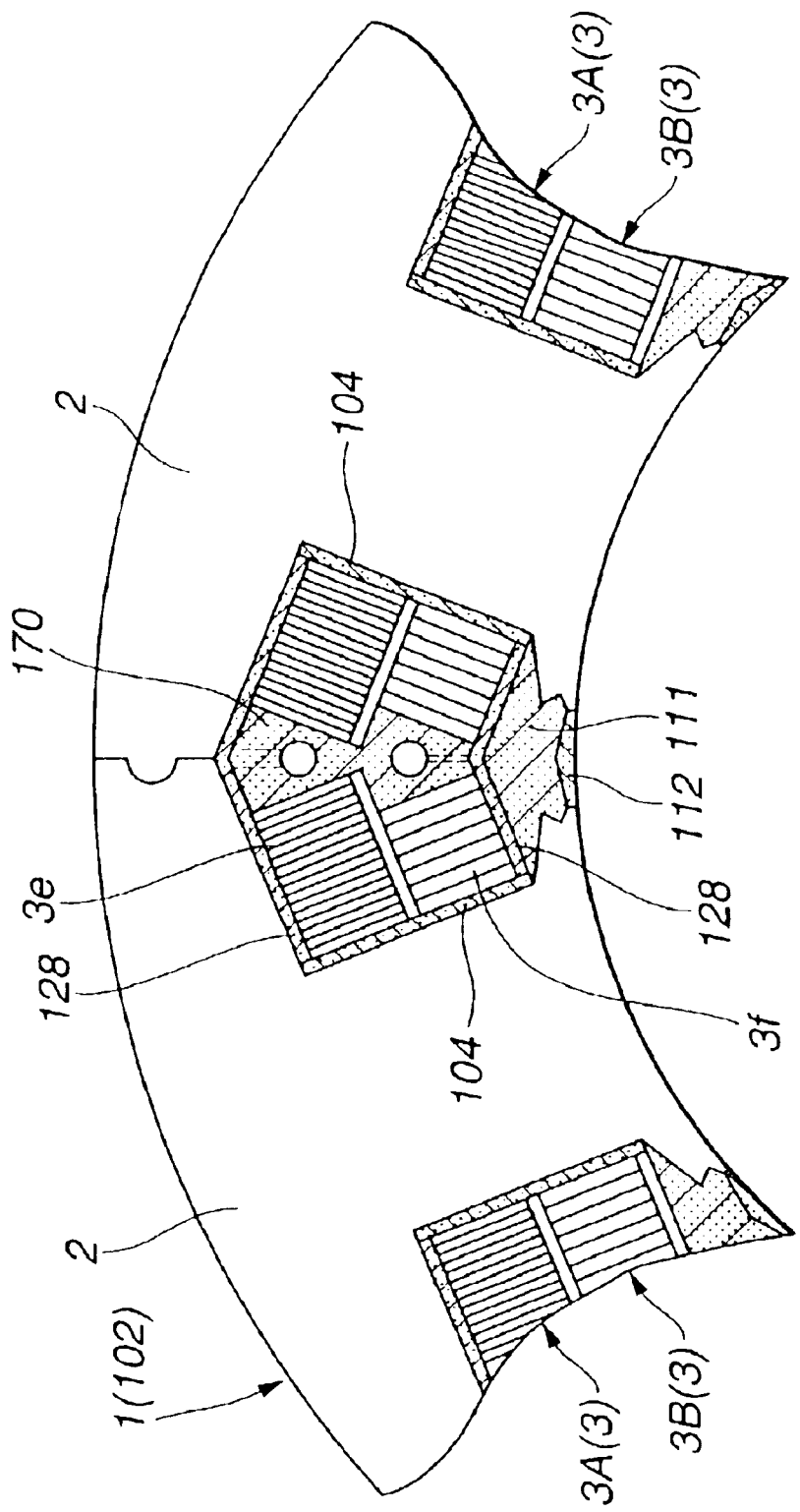
FIG. 35 is a sectional view showing a stator according to a sixteenth embodiment.

FIG. 35 shows a sixteenth embodiment. In this embodiment, wires of outer and inner windings 3A and 3B are different in sectional size.

As shown in FIG. 35, wire 3e for outer winding 3A and wire 3f for inner winding 3B are different in cross sectional shape (thickness×width). Accordingly, the sixteenth embodiment can set the copper losses due to current flow, of outer and inner windings 3A and 3B to desired values individually. In general, outer winding 3A is longer in the total wire length than inner winding 3B, and hence greater in electric resistance. Accordingly, outer winding 3A tends to produce more heat.

In view of the cooling environment of stator core, outer winding 3A is closer to core segment 2 of good thermal conductivity, and hence advantageous in cooling effect as compared to inner winding 3B. On the other hand, inner winding 3B on the radial inner side of stator 1 is closer to the rotor suffering greater eddy current loss by higher harmonic component of magnetic field due to the concentrated winding stator, and hence susceptible to temperature increase by the radiation heat from rotor. Moreover, there is no good thermally conductive mass such as core segment on the radial inner side of inner winding 3B. Therefore, inner winding 3B is inferior in heat dissipation. In the example of FIG. 35, therefore, the sectional size (both thickness and width) of wire 3e for the outer winding 3A is made smaller than that of inner winding 3B. With smaller cross sectional size, and larger number of turns, outer winding 3A has greater resistance, and tends to produce more heat as compared to inner winding 3B. The technique of filling resin as in the thirteenth embodiment is effective when the heat generation is increased too much.

Figure 36:
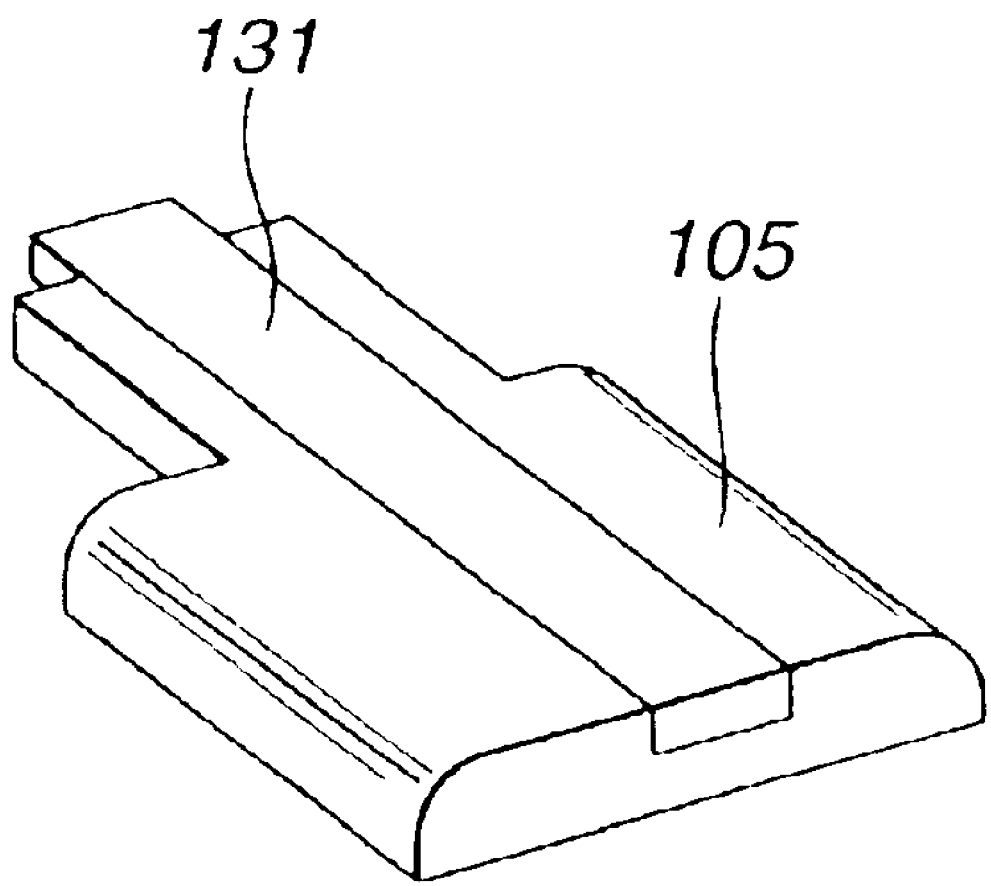
FIG. 36 is a perspective view showing an end cap and a connecting member of a stator according to a seventeenth embodiment.

FIG. 36 shows a seventeenth embodiment. End caps 105 are attached, respectively, to both axial ends of each core segment 2. End cap 105 shown in FIG. 36 includes a connecting member 131 for electrically connecting outer and inner windings 3A and 3B. In the twelfth and subsequent embodiments employing the winding of first and second windings, the inner starting ends of outer and inner windings 3A and 3B are electrically connected together. For the electrical connection between outer and inner windings 3A and 3B, connecting member 131 is preliminarily fit in a groove formed in end cap 105 as shown in FIG. 36. Connecting member 131 extends in the radial direction of the annular stator, and the radial length of connecting member 131 is greater than the sum of widths of outer and inner windings 3A and 3B. Connecting member 131 projects radially outwardly of the annular stator beyond outer winding 3A.

Figure 37A:
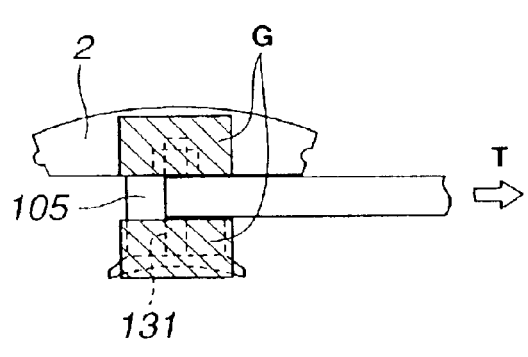
FIGS. 37A~37E are views showing a process of winding wire on the stator using the end cap shown in FIG. 36.
Figure 37B:
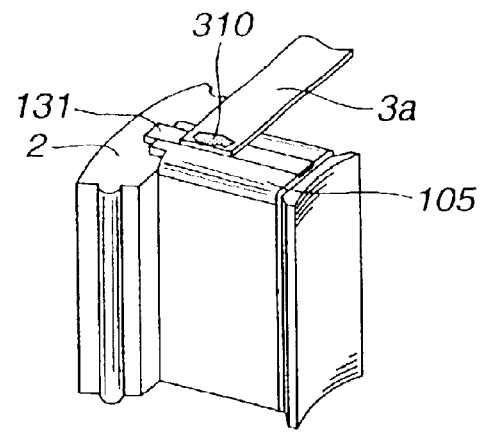
Figure 37C:
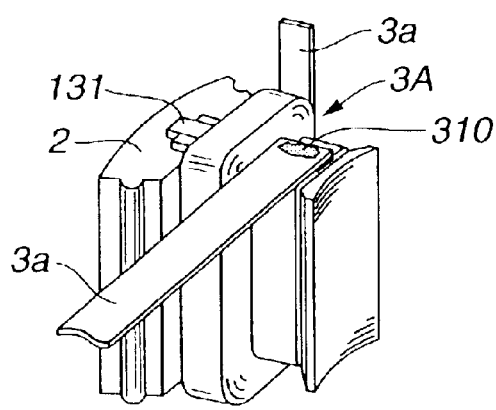
Figure 37D:
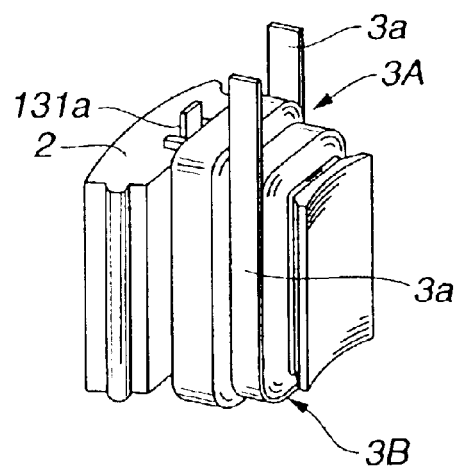

FIGS. 37A–37E show a process of forming windings 3A and 3B. As shown in FIG. 37A, end caps 105 are placed on both ends of core segment 2 in the laminate direction or the axial direction of the stator, and core segment 2, end caps 105 and connecting member 131 are clamped together in clamping regions G with a jig. End caps 105 and connecting member 131 are firmly fixed to core segment 2. Thereafter, as shown in FIG. 37B, the stating end of wire 3a is joined to connecting member 131 in a joint region 310, by ultrasonic welding. In this case, the joint interface in the joint region 310 is made greater than the cross sectional area of wire 3a. When wire 3a is coated with heat resisting film such as PIW film, AIW film or EIW film, the coating film is removed from the starting end of wire 3a before the joining operation according to the need. After the joining operation of FIG. 37B, wire 3a is wound just on previous turn with a predetermined tension T until the number of turns reaches a predetermined number. Then, the clamp for end caps 105 and connecting member 131 is removed, and the starting end of inner winding 3B is joined to connecting member 131 in the same manner as shown in FIG. 37C. Thereafter, wire 3a for inner winding 3B is wound in the opposite direction to outer winding 3A, up to a predetermined number of turns, as shown in FIG. 37D. In the winding operation for each winding, it is possible to form an insulating layer of insulating paper or insulating adhesive between the starting end of wire and wire section of the second turn, to secure the insulation.

Figure 37E:
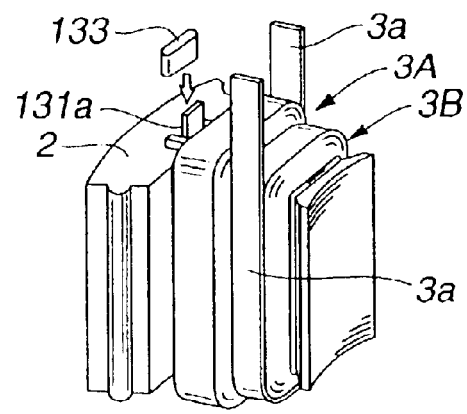

After the winding operations for outer and inner windings 3A and 3B, a projecting end portion 131a of connecting member 131 is bent to a right angle. Thus, projecting end portion 131a projects upright from connecting member 131, as shown in FIG. 37D. Then, projecting end portion 131a of connecting member 131 is covered with a cap 133 for insulation, as shown in FIG. 37E.

Projecting end portion 131a of connecting member 131 is immersed in cooling oil during the motor operation. Accordingly, connecting member 131 of this embodiment can function to cool the inner circumferences of windings 3A and 3B effectively. In the operation of winding wire for first winding 3A, both ends of connecting member 131 are fixed by clamping with the jig, firmly to prevent connecting member 131 from being removed by the tension of wire 3a. In the operation of winding wire for second winding 3B, first winding 3A already wound on connecting member 131 acts to secure connecting member 131 firmly. The process is advantageous in improving the productivity.

This application is based on a prior Japanese Patent Applications No. 2002-163687 filed in Japan on Jun. 5, 2002 and a prior Japanese Patent Application No. 2001-361915 filed in Japan on Nov. 28, 2001. The entire contents of these prior Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A stator of a motor, comprising:
a core segment forming a stator core;
a stator winding including a first winding wound in one direction on the core segment, and a second winding wound in the opposite direction on the core segment;
an insulating member interposed between the core segment and the stator winding; and
a connecting member formed integrally in the insulating member, and arranged to electrically connect inner ends of the first and second windings to form a single continuous winding.

2. The stator as claimed in claim 1, wherein the core segment includes a pole portion about which the first and second windings are wound side by side; each of the first and second windings is a flatwise coils of a flat wire wound about the salient pole portion of the core segment; the insulating member comprises first and second end caps each insulating the first and second winding from one of ends of the salient pole portion of the core segment; and the connecting member is an integral part of one of the first and second end caps.

3. The stator as claimed in claim 2, wherein the connecting member comprises a protruding portion which protrudes outward beyond a contact surface bared in a surface of the insulating member, and which is embedded in the insulating member.

4. The stator as claimed in claim 2, wherein the connecting member comprises an oblique surface extending obliquely with respect to an axis about which the first and second windings are wound.

5. The stator as claimed in claim 2, wherein the insulating member comprises a first projection confronting the inner end of the first winding.

6. The stator as claimed in claim 5, wherein the first projection of the insulating member extends over a side portion of the connecting member.

7. The stator as claimed in claim 5, wherein the insulating member further comprises a second projection confronting the inner end of the second winding; and the connecting member comprises a contact surface extending between the first and second projections of the insulating member, and including a first contact region contacting with the first winding, and a second contact region contacting with the second winding.

8. The stator as claimed in claim 5, wherein the height of the first projection of the insulating member is equal to or greater than a thickness of the flat wire.

9. The stator as claimed in claim 5, wherein the first projection of the insulating member includes an abutting surface abutting against the inner end of the first winding.

10. The stator as claimed in claim 5, wherein the first projection of the insulating member is formed with a groove to receive the inner end of the first winding.

11. The stator as claimed in claim 2, wherein the connecting member is formed with a groove receiving the inner end of the first winding.

12. The stator as claimed in claim 11, wherein the groove of the connecting member extends obliquely so that the inner end of the first winding is bent so as to form an obtuse angle; and the connecting member is formed with a second groove receiving the inner end of the second winding and extending obliquely so that the inner end of the second winding is bent so as to form an obtuse angle.

13. The stator as claimed in claim 11, wherein the connecting member comprises a first projecting portion projecting from the insulating member on a first side of the groove of the connecting member, and a first non-projecting portion formed on a second side of the groove of the connecting member; and a wire of the first winding extends on the first non-projecting portion, from the inner end of the first winding.

14. The stator as claimed in claim 11, wherein the groove of the connecting member extends continuously with a uniform sectional shape, from a first groove portion receiving the inner end of the first winding, to a second groove portion receiving the inner end of the second winding.

15. The stator as claimed in claim 2, wherein the connecting member comprises a first connecting portion extending in an axial direction of the stator, and the inner end of the first winding is joined to the first connecting portion of the connecting member.

16. The stator as claimed in claim 15, wherein the connecting member comprises a middle portion which extends in a radial direction of the stator and which is formed integrally in the insulating member, and the first connecting portion extends in the axial direction of the stator so that a bend is formed between the middle portion and the first connecting portion.

17. The stator as claimed in claim 16, wherein the first connecting portion of the connecting member is bent so as to form the bend between the main portion and the first connecting portion after the inner end of the wire of the first winding is joined with the first connecting portion.

18. The stator as claimed in claim 1, wherein the stator is annular, and comprises a plurality of stator segments arranged in a circle; each of the stator segments comprises the core segment, the stator winding, the insulating member and the connecting member; the stator core is annular and the core segments are arranged in a circle to form the stator core with slots each formed between two adjacent core segments; and the stator further comprises a plurality of spacers each of which is inserted between the stator windings of two adjacent stator segments.

19. The stator as claimed in claim 18, wherein each of the spacers is arranged to block an interspace formed in a corresponding one of the slots between the stator windings of two adjacent stator segments, and thereby to cause a cooling medium to flow through a clearance formed in the stator winding of each adjacent stator segment.

20. The stator as claimed in claim 19, wherein the stator further comprises a plurality of closing members each closing an inlet portion of one of the slots, and a wall portion defining a coolant path to flow the cooling medium in an axial direction of the stator through the slots.

21. The stator as claimed in claim 20, wherein a coolant passage is formed between the first and second windings in each stator segment, and each spacer abuts against the stator windings on both sides.

22. The stator as claimed in claim 20, wherein each of the stator segment further comprises an outer resin layer formed, on a radial outer side of the stator winding, between the core segment and the stator winding, and an inner resin layer formed on a radial inner side of the stator winding, and each spacer is formed with a runner which extends in an axial direction of the stator and which leads to at least one of the outer and inner resin layers.

23. The stator as claimed in claim 22, wherein the outer and inner resin layers are made of a resin, and the runner of each spacer is filled with the resin.

24. The stator as claimed in claim 22, wherein each of the spacers includes an outer abutting surface abutting on only a radial inner part of an outer circumferential surface of the first winding located on a radial outer side of the second winding, and an inner abutting surface abutting on only a radial outer part of an outer circumferential surface of the second winding.

25. The stator as claimed in claim 20, wherein each of the spacers includes an outer abutting surface abutting on only a radial outer part of an outer circumferential surface of the first winding located on a radial outer side of the second winding, and an inner abutting surface abutting on only a radial inner part of an outer circumferential surface of the second winding.

26. The stator as claimed in claim 25, wherein each of the spacers includes an outer depressed surface which is depressed from the outer abutting surface which confronts a radial inner part of the outer circumferential surface of the first winding across a clearance formed between the outer depressed surface and the radial inner part of the outer circumferential surface of the first winding, and an inner depressed surface which is depressed from the inner abutting surface and which confronts a radial outer part of the outer circumferential surface of the second winding across a clearance formed the inner depressed surface and the radial outer part of the outer circumferential surface of the second winding.

27. The stator as claimed in claim 19, wherein wires of the first and second windings are different in a cross sectional area.

28. The stator as claimed in claim 1, wherein the connecting member of each stator segment includes a projecting portion projecting from the stator winding.

29. A process of producing a stator of a motor, comprising:

forming an insulating member including a connecting member as an integral part;

attaching the insulating member to a core segment forming a stator core;

joining an inner end of a wire of a first winding of a stator winding to a first portion of the connecting member;

winding the wire of the first wining on the insulating member around the core segment in one direction;

joining an inner end of a wire of second winding of stator winding to a second portion of the connecting member; and winding the wire of the second winding on the insulating member around the core section in the opposite direction.

30. The process as claimed in claim 29, wherein a process element of forming the insulating member comprises an operation of molding an insulating resin into a shape of the insulating member with the connecting member as an insert; the process further comprises bending an inner end of the wire of the first winding before joining the inner end of the wire of the first winding to the first portion of the connecting member, and bending an inner end of the wire of the second winding before joining the inner end of the wire of the second winding to the second portion of the connecting member.

31. The process as claimed in claim 29, wherein the process further comprises bending a first projecting connecting portion of the connecting member after joining the inner end of the wire of the first winding to the projecting connecting portion of the connecting member, and bending a second projecting connecting portion of the connecting member after joining the inner end of the wire of the second winding to the second projecting connecting portion of the connecting member.

* * * * *